United States Patent
Adsumilli et al.

(10) Patent No.: US 11,030,717 B2
(45) Date of Patent: *Jun. 8, 2021

(54) APPARATUS AND METHODS FOR MULTI-RESOLUTION IMAGE STITCHING

(71) Applicant: GoPro, Inc., San Mateo, CA (US)

(72) Inventors: Balineedu Chowdary Adsumilli, San Francisco, CA (US); Adeel Abbas, Carlsbad, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/656,396

(22) Filed: Oct. 17, 2019

(65) Prior Publication Data

US 2020/0118246 A1 Apr. 16, 2020

Related U.S. Application Data

(63) Continuation of application No. 15/643,123, filed on Jul. 6, 2017, now Pat. No. 10,482,574.

(60) Provisional application No. 62/359,116, filed on Jul. 6, 2016.

(51) Int. Cl.
*H04N 5/232* (2006.01)
*G06T 3/40* (2006.01)

(52) U.S. Cl.
CPC .......... *G06T 3/4038* (2013.01); *G06T 3/4084* (2013.01); *H04N 5/23238* (2013.01)

(58) Field of Classification Search
None
See application file for complete search history.

(56) References Cited

U.S. PATENT DOCUMENTS

| 7,596,284 | B2 | 9/2009 | Samadani | |
| 2001/0031005 | A1* | 10/2001 | Nister | ...................... G06T 17/00 375/240.16 |
| 2010/0097444 | A1 | 4/2010 | Lablans | |
| 2010/0271511 | A1 | 10/2010 | Ma | |

(Continued)

*Primary Examiner* — Mulugeta Mengesha
*Assistant Examiner* — Charles N Hicks
(74) *Attorney, Agent, or Firm* — Young Basile Hanlon & MacFarlane, P.C.

(57) ABSTRACT

Systems and methods for providing panoramic image and/or video content using multi-resolution stitching. Panoramic content may include stitched spherical (360-degree) images and/or VR video. In some implementations, multi-resolution stitching functionality may be embodied in a spherical image capture device that may include two lenses configured to capture pairs of hemispherical images. The capture device may obtain images (e.g., representing left and right hemispheres) that may be characterized by 180-degree (or greater) field of view. Source images may be combined using multi-resolution stitching methodology. Source images may be transformed to obtain multiple image components characterized by two or more image resolutions. The stitched image may be encoded using selective encoding methodology including: partitioning source images into a low resolution/frequency and a high resolution/frequency components; stitching low resolution/frequency components using coarse stitching operation, stitching high resolution/high frequency components using a refined stitch operation; combining stitched LF components and stitched HF components.

20 Claims, 10 Drawing Sheets

(56) References Cited

U.S. PATENT DOCUMENTS

| | | |
|---|---|---|
| 2012/0177253 A1 | 7/2012 | Tseng |
| 2013/0163896 A1 | 6/2013 | Chen |
| 2013/0210563 A1* | 8/2013 | Hollinger ............... A63B 43/06 473/570 |
| 2014/0300687 A1* | 10/2014 | Gillard ................. H04N 5/2628 348/36 |
| 2015/0193909 A1* | 7/2015 | Maayan ............. H04N 5/23238 345/648 |

* cited by examiner

APPARATUS AND METHODS FOR MULTI-RESOLUTION IMAGE STITCHING

PRIORITY

This application is a continuation of and claims the benefit of priority to U.S. patent application Ser. No. 15/643,123 filed Jul. 6, 2017 and entitled "SYSTEMS AND METHODS FOR MULTI-RESOLUTION IMAGE STITCHING," which claims the benefit of priority to U.S. Provisional Patent Application Ser. No. 62/359,116 filed Jul. 6, 2016 of the same title and entitled "SYSTEMS AND METHODS FOR MULTI-RESOLUTION IMAGE STITCHING", the contents of which each being incorporated herein by reference in its their entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to storing and/or presenting of image and/or video content and more particularly in one exemplary aspect to encoding, decoding, and/or transmission of panoramic and/or spherical video content.

Description of Related Art

Virtual reality (VR) video content and/or panoramic video content may include a bitstream characterized by high data rates, e.g., in excess of 10 megabits per second (mbps). A user may wish to view high data rate content on a resource limited device (e.g., battery operated computing device (e.g., a tablet computer, a smartphone)) and/or other device that may be characterized by a given amount of available energy, data transmission bandwidth, and/or computational capacity. Resources available to such resource limited device may prove inadequate for receiving and/or decoding full resolution and/or full frame high resolution image content.

Figure 1A:
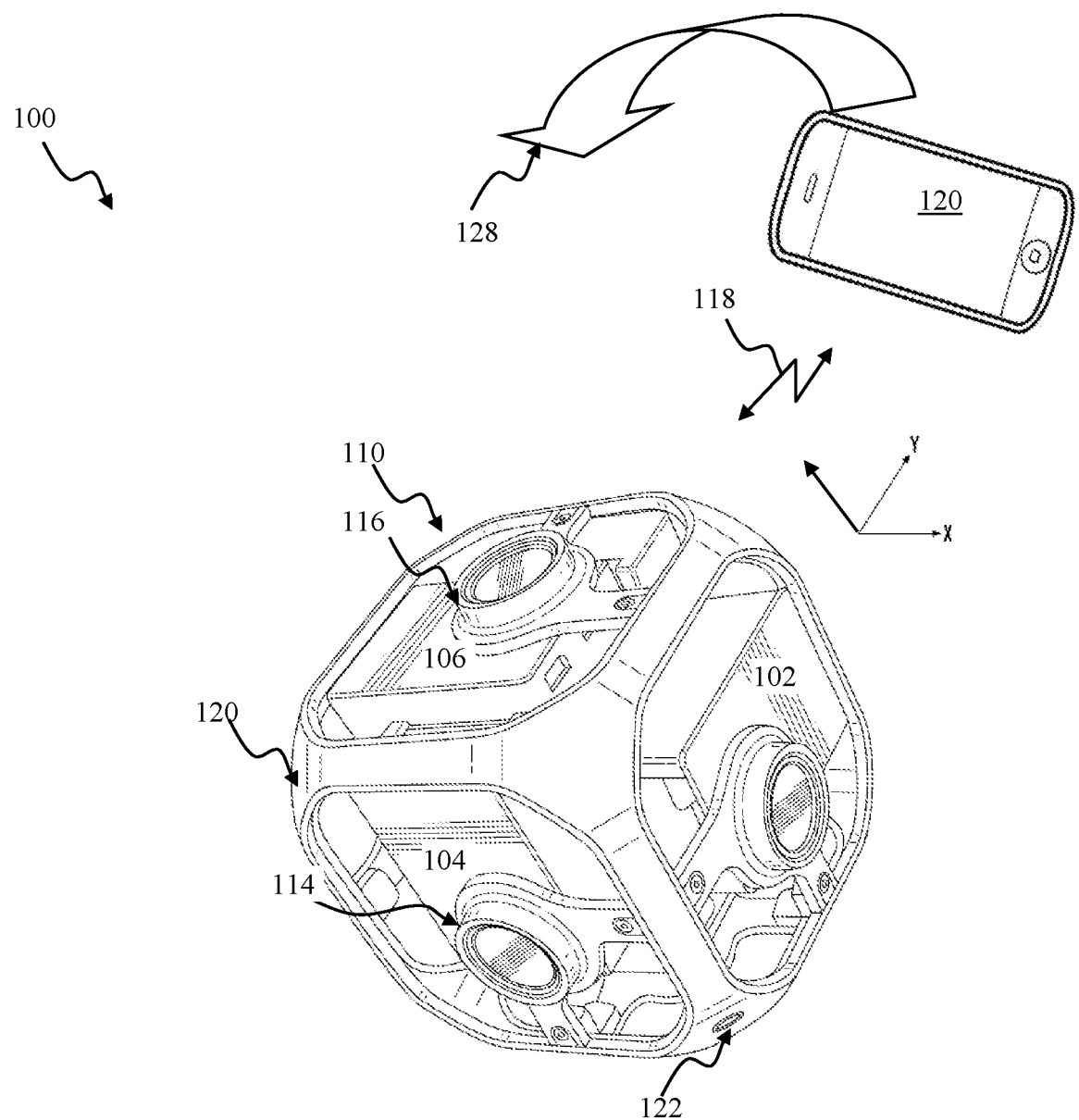
FIG. 1A illustrates a system for content capture and viewing.

All Figures disclosed herein are © Copyright 2020 GoPro Inc. All rights reserved.

SUMMARY

The present disclosure satisfies the foregoing needs by providing, inter alia, methods and apparatus for providing a panoramic image in accordance with various stitching methodologies.

In a first aspect, a system for providing a panoramic image is disclosed. In one embodiment, the system includes: an electronic storage configured to store video content, the video content including a first and a second image of a visual scene, the first image and the second image including a region of overlap within the visual scene, and where the first and the second image share an image boundary; a communications interface configured to communicate a bit stream to a client device; and one or more processors configured to execute a plurality of computer readable instructions. In one exemplary embodiment, the system further includes: a non-transitory computer readable medium comprising the plurality of computer readable instructions that are configured to, when executed by the one or more processors, cause the processor to: transform the first image into a first component characterized by a first image resolution and a second component characterized by a second image resolution; transform the second image into a third component characterized by the first image resolution and a fourth component characterized by the second image resolution and; combine the first component and the third component to produce a first stitched image version with a first image stitching operation configured to reduce a contrast measure across the image boundary; combine the second component and the fourth component to produce a second stitched image version with a second image stitching operation configured to reduce the contrast measure across the image boundary; and combine the first stitched image component and the second stitched image component to create the panoramic image; wherein the first image stitching operation is characterized by a first complexity parameter configured lower than a second complexity parameter associated with the second image stitching operation.

In one variant, the system includes an image capture apparatus.

In another variant, the first image resolution is one half of an original resolution of the first image.

In yet another variant, the second image resolution equals an original resolution of the first image. In one such case, the transformations include a wavelet-based image decomposition. In another such case, at least one of the first and second components obtained based on the transformation of the first image includes a downsampled version of the first image. In some variants, at least one of the third and fourth components obtained based on the transformation of the second image includes a downsampled version of the second image. In still other variants, at least one of the first and second components obtained based on the transformation of the first image includes a residual image version characterizing one or more first high frequency content in the first image; and at least one of the third and fourth components obtained based on the transformation of the second image includes a residual image version characterizing one or more second high frequency content in the second image.

In a second aspect, a method for providing video content is disclosed. In one embodiment, the method includes: transforming one or more images into a corresponding components characterized by multiple resolutions; for each one of the multiple resolutions: stitching the corresponding components of each resolution; and combining the stitched components into a multi-resolution panoramic image; wherein each one of the multiple resolutions is characterized by a different complexity.

In one variant, the one or more images comprise at least a first and a second image of a visual scene; wherein the first image and the second image include a region of overlap within the visual scene; and wherein the first and the second image share an image boundary.

In another variant, the multiple resolutions comprise at least a first resolution and a second resolution; and wherein the first resolution comprises a downsampled version of an original resolution; wherein the second resolution comprises the same resolution as the original resolution.

In yet another variant, the transforming one or more images comprises downsampling the one or more images by a factor of two.

In yet another variant, the transforming one or more images comprises creating a low frequency energy representation of the one or more images.

In yet another variant, the transforming one or more images comprises creating a high frequency energy representation of the one or more images. In some cases, the creating the high frequency energy representation of the one or more images is performed along at least one dimension. For example, the creating the high frequency energy representation of the one or more images is performed along at least two dimensions.

In a third aspect, a non-transitory computer readable medium comprising a plurality of computer readable instructions is disclosed. In one exemplary embodiment, the instructions are configured to, when executed by the one or more processors, cause a processor to: obtain a plurality of image components, each image component characterized by a corresponding resolution; wherein at least two image components of the plurality of image components share an image boundary and have a same resolution; for the at least two image components, reduce a difference measure across the image boundary; and combine various ones of the plurality of image components and the at least two image components into a multi-resolution image.

In one variant, the plurality of image components comprise distinct views of a visual panorama.

In another variant, the plurality of image components comprises at least one low energy component and one high energy component. In some cases, the low energy component has a first resolution that is half of a second resolution corresponding to the high energy component. In some cases, the difference measure comprises a contrast measure.

In a fourth aspect, a hardware component is disclosed. In one embodiment, the hardware component includes logic configured to: transform one or more images into a corresponding components characterized by multiple resolutions; for each one of the multiple resolutions: stitch the corresponding components of each resolution; and combine the stitched components into a multi-resolution panoramic image; wherein each one of the multiple resolutions is characterized by a different complexity.

In another aspect, a computerized apparatus for providing a panoramic image is disclosed.

In one embodiment, the apparatus includes: a non-transitory computer-readable medium including a plurality of computer-readable instructions configured to, when executed by one or more processor apparatus, cause the apparatus to: obtain a plurality of high-resolution input images from a plurality of capture devices; transform the plurality of high-resolution input images to produce at least a first downsampled image, a second downsampled image, a first residual image, and a second residual image; combine the first downsampled image with the second downsampled image to produce a combined downsampled image; combine the first residual image with the second residual image to produce a combined residual image; and combine the combined downsampled image with the combined residual image to produce the panoramic image.

In another embodiment, the apparatus includes: a non-transitory computer-readable medium including a plurality of computer-readable instructions configured to, when executed by one or more processor apparatus, cause the apparatus to: obtain a first high-resolution input image and a second high-resolution input image; process the first and second high-resolution input images, the processing including at least a decomposition of the first and second high-resolution input images to produce at least (i) a first image component and a second image component corresponding to the first high-resolution input image, and (ii) a first image component and a second image component corresponding to the second high-resolution input image; combine at least the first image component corresponding to the first high-resolution input image with the first image component corresponding to the second high-resolution input image to produce a first combined image component; combine at least the second image component corresponding to the first high-resolution input image with the second image component corresponding to the second high-resolution input image to produce a second combined image component; and combine at least the first combined image component with the second combined image component to produce the panoramic image.

In another aspect, a method for generating multi-resolution content is disclosed. In one embodiment, the method includes: obtaining a first high-resolution input image via a first camera; obtaining a first image component and a second image component each being resultant from a decomposition of the first high-resolution input image, the first image component having a first resolution, the second image component having a second resolution that is different from the first resolution; obtaining a third image component and a fourth image component, the third and fourth image components being resultant from the decomposition of the first high-resolution input image, the third and fourth image components having the second resolution; and combining the first, second, third and fourth image components to generate a multi-resolution image.

Other features and advantages of the present disclosure will immediately be recognized by persons of ordinary skill in the art with reference to the attached drawings and detailed description of exemplary embodiments as given below.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation or implementations, but other implementations are possible by way of interchange of or combination with some or all of the described or illustrated elements. Wherever convenient, the same reference numbers will be used throughout the drawings to refer to same or like parts.

Systems and methods for providing panoramic image and/or video content using multi-resolution stitching are provided. Panoramic content (e.g., content captured using 180°, 360° view field and/or other fields of view) and/or virtual reality (VR) content, may be characterized by high image resolution (e.g., 8000 pixels by 4000 pixels (8K)) and/or high bit rates (e.g., in excess of 100 megabits per second (mbps)). Presently available standard video compression codecs, e.g., H.264 (described in ITU-T H.264 (01/2012) and/or ISO/IEC 14496-10:2012, Information technology—Coding of audio-visual objects—Part 10: Advanced Video Coding, each of the foregoing incorporated herein by reference in its entirety), High Efficiency Video Coding (HEVC), also known as H.265 (described in e.g., ITU-T Study Group 16—Video Coding Experts Group (VCEG)—ITU-T H.265, and/or ISO/IEC JTC 1/SC 29/WG 11 Motion Picture Experts Group (MPEG)—the HEVC standard ISO/IEC 23008-2:2015, each of the foregoing incorporated herein by reference in its entirety), and/or VP9 video codec (described at e.g., http://www.webmproject.org/vp9, the foregoing incorporated herein by reference in its entirety), may prove non-optimal for providing a viewport portion of the panoramic and/or VR content to resource limited devices.

When obtaining panoramic (e.g., 360°) content two or more images may be combined. In some implementations, six or more source images may be combined (stitched together along a boundary between the images) to obtain an image with 360°. In some implementations the source images may be obtained using a multi-lens and/or multi-camera system, such as the capture apparatus 110 shown and described with respect to FIG. 1A. In some implementations, two source images (e.g., 180° or greater field of view (FOV)) may be stitched along a boundary between the images to obtain an image with 360° FOV. This stitched image may be rendered in equirectangular projection (ERP), cubic projection, and/or another projection. The source images may be obtained using a dual-lens camera system, such as the system 200 shown and described with respect to FIG. 2A.

Stitching of panoramic images may be computationally intensive. Thus, there is a need for fast and scalable stitch algorithms for delivering panoramic content via a network to mobile devices. Stitch algorithms may be configured to adapt to varying network and/or computational latency and/or throughput, particularly when delivering content to mobile devices and head mounted displays (HMD). In some implementations, the stitching methodology described herein may be employed at the decoder (decode side stitching). In one or more implementations, stitching may be performed prior to encoding, thereby enabling faster stitch performance, and as a result a better video editing experience of, for example, 360-degree video.

Panoramic content may include stitched spherical (360-degree) images and/or VR video. In some implementations, multi-resolution stitching functionality may be embodied in a spherical image capture device that may include two lenses configured to capture pairs of hemispherical images. The capture device may obtain images (e.g., representing left and right hemispheres) that may be characterized by a 180-degree (or greater) field of view. Source images may be combined using multi-resolution stitching methodology. Source images may be transformed to obtain multiple image components characterized by two or more image resolutions. Stitched images may be encoded using selective encoding methodology including (but not limited to): partitioning source images into low resolution/frequency and high resolution/frequency components; stitching low resolution/frequency components using a coarse stitching operation, stitching high resolution/high frequency components using a refined stitching operation; and combining the stitched low resolution/frequency component and stitched high resolution/frequency components.

FIG. 1A illustrates an exemplary capture system configured for acquiring panoramic content, in accordance with one implementation. The system 100 of FIG. 1A may include a capture apparatus 110, e.g., such as GoPro activity camera, e.g., HERO4 Silver, and/or other image capture devices.

The capture apparatus 110 may include 6-cameras (e.g., 104, 106, 102) disposed in a cube-shaped cage 120. The cage 120 dimensions may be selected between 25 mm and 150 mm, preferably 105 mm in some implementations. The cage 120 may be outfitted with a mounting port 122 configured to enable attachment of the camera to a supporting structure (e.g., a tripod, a photo stick). The cage 120 may provide a rigid support structure. Use of a rigid structure may ensure that orientation of individual cameras with respect to one another may remain at a given configuration during operation of the apparatus 110.

Individual capture devices (e.g., 102) may comprise a video camera device, such as described in, e.g., such as described in U.S. patent application Ser. No. 14/920,427 entitled "APPARATUS AND METHODS FOR EMBEDDING METADATA INTO VIDEO STREAM" filed on 22 Oct. 2015, the foregoing being incorporated herein by reference in its entirety.

In some implementations, the capture device may include two camera components (including a lens and imaging sensors) that are disposed in a Janus configuration, e.g., back to back such as described in U.S. patent application Ser. No. 29/548,661, entitled "MULTI-LENS CAMERA" filed on 15 Dec. 2015, the foregoing being incorporated herein by reference in its entirety.

The capture apparatus 110 may be configured to obtain imaging content (e.g., images and/or video) with 360° field of view, also referred to as panoramic or spherical content, e.g., such as shown and described in U.S. patent application Ser. No. 14/949,786, entitled "APPARATUS AND METHODS FOR IMAGE ALIGNMENT" filed on 23 Nov. 2015, and/or U.S. patent application Ser. No. 14/927,343, entitled "APPARATUS AND METHODS FOR ROLLING SHUTTER COMPENSATION FOR MULTI-CAMERA SYSTEMS", filed 29 Oct. 2015, each of the foregoing being incorporated herein by reference in its entirety.

Individual cameras (e.g., 102, 104, 106) may be characterized by field of view 120° in longitudinal dimension and 90° in latitudinal dimension. In order to provide for an increased overlap between images obtained with adjacent cameras, image sensors of any two adjacent cameras may be configured at 90° with respect to one another. By way non-limiting illustration, longitudinal dimension of camera 102 sensor may be oriented at 90° with respect to longitudinal dimension of the camera 104 sensor; longitudinal dimension of camera 106 sensor may be oriented at 90° with respect to longitudinal dimension 116 of the camera 104 sensor. Camera sensor configuration illustrated in FIG. 1A, may provide for 420° angular coverage in vertical and/or horizontal planes. Overlap between fields of view of adjacent cameras may provide for an improved alignment and/or stitching of multiple source images to produce, e.g., a panoramic image, particularly when source images may be obtained with a moving capture device (e.g., rotating camera).

Individual cameras of the apparatus 110 may comprise a lens e.g., lens 114 of the camera 104, lens 116 of the camera 106. In some implementations, the individual lens may be characterized by what is referred to as fisheye pattern and produce images characterized by fish eye (or near-fish eye) field of view (FOV). Images captured by two or more individual cameras of the apparatus 110 may be combined using stitching of fisheye projections of captured images to produce an equirectangular planar image, in some implementations, e.g., such as shown in U.S. patent application Ser. No. 14/920,427 entitled "APPARATUS AND METHODS FOR EMBEDDING METADATA INTO VIDEO STREAM" filed on 22 Oct. 2015, incorporated herein by reference in its entirety. In some implementations, images captured by apparatus 110 may also be combined to produce a cubic projection without first converting captured images to equirectangular and/or other projection(s).

The capture apparatus 110 may house one or more internal metadata sources, e.g., video, inertial measurement unit, global positioning system (GPS) receiver component and/or other metadata source(s). In some implementations, the capture apparatus 110 may comprise a device described in detail in U.S. patent application Ser. No. 14/920,427, entitled "APPARATUS AND METHODS FOR EMBEDDING METADATA INTO VIDEO STREAM" filed on 22 Oct. 2015, incorporated supra. The capture apparatus 110 may comprise one or optical elements 102. Individual optical elements 116 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical elements.

The capture apparatus 110 may include one or more image sensors including, by way of non-limiting example, one or more of charge-coupled device (CCD) sensor, active pixel sensor (APS), complementary metal-oxide semiconductor (CMOS) sensor, N-type metal-oxide-semiconductor (NMOS) sensor, and/or other image sensors. The capture apparatus 110 may include one or more microphones configured to provide audio information that may be associated with images being acquired by the image sensor.

The capture apparatus 110 may be interfaced to an external metadata source (e.g., GPS receiver, cycling computer, metadata puck, and/or other device configured to provide information related to system 100 and/or its environment) via a remote link. The capture apparatus 110 may interface to an external user interface device 120 via the link 118. In some implementations, the device 120 may correspond to a smartphone, a tablet computer, a phablet, a smart watch, a portable computer, and/or other device configured to receive user input and communicate information with the camera capture device 110. In some implementation, the capture apparatus 110 may be configured to provide panoramic content (or portion thereof) to the device 120 for viewing.

In one or more implementations, the link 118 may be configured to utilize any practical wireless interface configuration, e.g., WiFi, Bluetooth (BT), cellular data link, ZigBee, near field communications (NFC) link, e.g., using ISO/IEC 14443 protocol, ANT+ link, and/or other wireless communications link. In some implementations, the link 118 functionality may be effectuated using a wired interface, e.g., HDMI, USB, digital video interface, display port interface (e.g., digital display interface developed by the Video Electronics Standards Association (VESA), Ethernet, Thunderbolt), and/or other interface.

In some implementations (not shown) one or more external metadata devices may interface to the apparatus 110 via a wired link, e.g., HDMI, USB, coaxial audio, and/or other interface. In one or more implementations, the capture apparatus 110 may house one or more sensors (e.g., GPS, pressure, temperature, heart rate, and/or other sensors). The metadata obtained by the capture apparatus 110 may be incorporated into the combined multimedia stream using any applicable methodologies including those described in U.S. patent application Ser. No. 14/920,427 entitled "APPARATUS AND METHODS FOR EMBEDDING METADATA INTO VIDEO STREAM" filed on 22 Oct. 2015, incorporated supra.

The user interface device 120 may operate a software application (e.g., GoPro Studio, GoPro App, and/or other application) configured to perform a variety of operations related to camera configuration, control of video acquisition, and/or display of video captured by the camera apparatus 110. An application (e.g., GoPro App) may enable a user to create short video clips and share clips to a cloud service (e.g., Instagram, Facebook, YouTube, Dropbox); perform full remote control of camera 110 functions, live preview video being captured for shot framing, mark key moments while recording with HiLight Tag, View HiLight Tags in GoPro Camera Roll for location and/or playback of video highlights, wirelessly control camera software, and/or perform other functions. Various methodologies may be utilized for configuring the camera apparatus 110 and/or displaying the captured information, including those described in U.S. Pat. No. 8,606,073, entitled "BROADCAST MANAGEMENT SYSTEM", issued Dec. 10, 2013, the foregoing being incorporated herein by reference in its entirety.

By way of illustration, the device 120 may receive user setting characterizing image resolution (e.g., 3840 pixels by 2160 pixels), frame rate (e.g., 60 frames per second (fps)), and/or other settings (e.g., location) related to the activity (e.g., mountain biking) being captured. The user interface device 120 may communicate the settings to the camera apparatus 110.

A user may utilize the device 120 to view content acquired by the capture apparatus 110. Display of the device 120 may act as a viewport into 3D space of the panoramic content. In some implementations, the user interface device 120 may communicate additional information (e.g., metadata) to the camera apparatus 110. By way of illustration, the device 120 may provide orientation of the device 120 with respect to a given coordinate system, to the apparatus 110 so as to enable determination of a viewport location and/or dimensions for viewing of a portion of the panoramic content. By way of illustration, a user may rotate (e.g., sweep) the device 120 through an arc in space (as illustrated by arrow 128 in FIG. 1A). The device 120 may communicate display orientation information to the capture apparatus 110. The capture apparatus 110 may provide an encoded bitstream configured to enable viewing of a portion of the panoramic content corresponding to a portion of the environment of the display location as it traverses the path 128.

The capture apparatus 110 may include a display configured to provide information related to camera operation mode (e.g., image resolution, frame rate, capture mode (sensor, video, photo), connection status (connected, wireless, wired connection), power mode (e.g., standby, sensor mode, video mode), information related to metadata sources (e.g., heart rate, GPS), and/or other information. The capture apparatus 110 may include a user interface component (e.g., one or more buttons) configured to enable a user to start, stop, pause, resume sensor and/or content capture. User commands may be encoded using a variety of approaches including but not limited to duration of button press (pulse width modulation), number of button presses (pulse code modulation) and/or a combination thereof. By way of illustration, two short button presses may initiate sensor acquisition mode described in detail elsewhere; single short button press may be used to (i) communicate initiation of video and/or photo capture and cessation of video and/or photo capture (toggle mode); or (ii) video and/or photo capture for a given time duration or number of frames (burst capture). It will be recognized by those skilled in the arts that various user command communication implementations may be realized, e.g., short/long button presses.

Figure 1B:
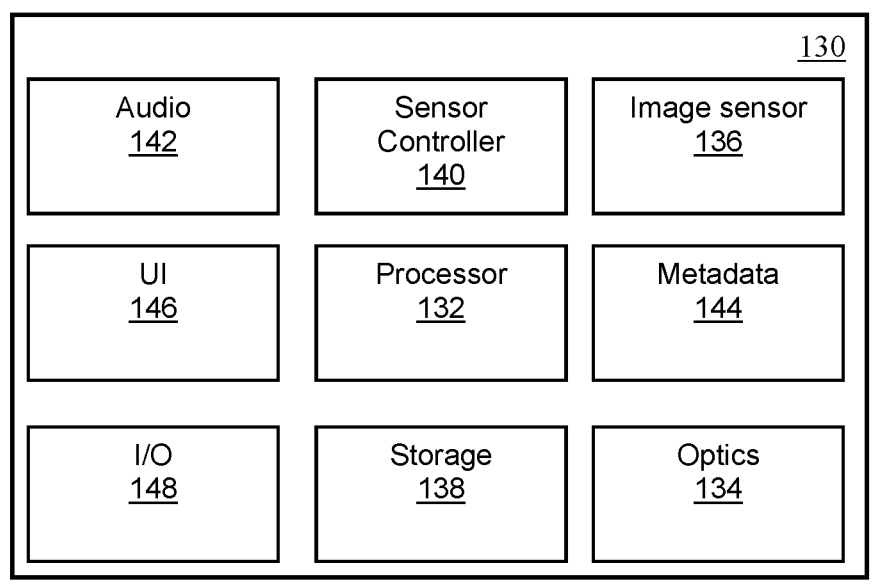
FIG. 1B is a functional block diagram illustrating a capture device for use with, e.g., the system of FIG. 1A.

FIG. 1B illustrates one implementation of a camera apparatus for collecting metadata and content. The apparatus of FIG. 1B may comprise a capture device 130 that may include one or more processors 132 (such as system on a chip (SOC), microcontroller, microprocessor, CPU, DSP, ASIC, GPU, and/or other processors) that control the operation and functionality of the capture device 130. In some implementations, the capture device 130 in FIG. 1B may correspond to an action camera configured to capture photo, video and/or audio content.

The capture device 130 may include an optics module 134. In one or more implementations, the optics module 134 may include, by way of non-limiting example, one or more of standard lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics module 134 may implement focus controller functionality configured to control the operation and configuration of the camera lens. The optics module 134 may receive light from an object and couple received light to an image sensor 136. The image sensor 136 may include, by way of non-limiting example, one or more of charge-coupled device sensor, active pixel sensor, complementary metal-oxide semiconductor sensor, N-type metal-oxide-semiconductor sensor, and/or other image sensor. The image sensor 136 may be configured to capture light waves gathered by the optics module 134 and to produce image(s) data based on control signals from the sensor controller module 140. Optics module 134 may comprise focus controller configured to control the operation and configuration of the lens. The image sensor may be configured to generate a first output signal conveying first visual information regarding the object. The visual information may include, by way of non-limiting example, one or more of an image, a video, and/or other visual information. The optical element, and the first image sensor may be embodied in a housing.

In some implementations, the image sensor module 136 may include, without limitation, video sensors, audio sensors, capacitive sensors, radio sensors, vibrational sensors, ultrasonic sensors, infrared sensors, radar, LIDAR and/or sonars, and/or other sensory devices.

The apparatus 130 may include one or more audio components (e.g., microphone(s) embodied within the camera (e.g., 142). Microphones may provide audio content information.

The apparatus 130 may include a sensor controller module 140. The sensor controller module 140 may be used to operate the image sensor 136. The sensor controller module 140 may receive image or video input from the image sensor 136; audio information from one or more microphones, such as 142. In some implementations, audio information may be encoded using audio coding format, e.g., AAC, AC3, MP3, linear PCM, MPEG-H and or other audio coding format (audio codec). In one or more implementations of spherical video and/or audio, the audio codec may comprise a 3-dimensional audio codec, e.g., Ambisonics such as described at http://www.ambisonic.net/ and/or http://www.digital-brainstorming.ch/db_data/eve/ambisonics/text01.pdf, the foregoing being incorporated herein by reference in its entirety.

The apparatus 130 may include one or more metadata modules embodied (e.g., 144) within the camera housing and/or disposed externally to the camera. The processor 132 may interface to the sensor controller and/or one or more metadata modules 144. Metadata module 144 may include sensors such as an inertial measurement unit (IMU) including one or more accelerometers and/or gyroscopes, a magnetometer, a compass, a global positioning system (GPS) sensor, an altimeter, ambient light sensor, temperature sensor, and/or other sensors. The capture device 130 may contain one or more other metadata/telemetry sources, e.g., image sensor parameters, battery monitor, storage parameters, and/or other information related to camera operation and/or capture of content. Metadata module 144 may obtain information related to environment of the capture device and aspect in which the content is captured. By way of non-limiting example, an accelerometer may provide device motion information, comprising velocity and/or acceleration vectors representative of motion of the capture device 130; the gyroscope may provide orientation information describing the orientation of the device 130, the GPS sensor may provide GPS coordinates, time, identifying the location of the device 130; and the altimeter may obtain the altitude of the camera 130. In some implementations, internal metadata module 144 may be rigidly coupled to the capture device 130 housing such that any motion, orientation or change in location experienced by the device 130 is also experienced by the metadata sensors 144. The sensor controller module 140 and/or processor 132 may be operable to synchronize various types of information received from the metadata sources. For example, timing information may be associated with the sensor data. Using the timing information metadata information may be related to content (photo/video) captured by the image sensor 136. In some implementations, the metadata capture may be decoupled from video/image capture. That is, metadata may be stored before, after, and in-between one or more video clips and/or images. In one or more implementations, the sensor controller module 140 and/or the processor 132 may perform operations on the received metadata to generate additional metadata information. For example, the microcontroller may integrate the received acceleration information to determine the velocity profile of the capture device 130 during the recording of a video. In some implementations, video information may consist of multiple frames of pixels using any applicable encoding method (e.g., H262, H.264, Cineform and/or other standard(s)).

The apparatus 130 may include electronic storage 138. The electronic storage 138 may comprise a system memory module that is configured to store executable computer instructions that, when executed by the processor 132, perform various camera functionalities including those described herein. The electronic storage 138 may comprise storage memory configured to store content (e.g., metadata, images, audio) captured by the apparatus.

The electronic storage 138 may include non-transitory memory configured to store configuration information and/or processing code configured to enable, e.g., video information, metadata capture and/or to produce a multimedia stream comprised of, e.g., a video track and metadata in accordance with the methodology of the present disclosure. In one or more implementations, the processing configuration may comprise capture type (video, still images), image resolution, frame rate, burst setting, white balance, recording configuration (e.g., loop mode), audio track configuration, and/or other parameters that may be associated with audio, video and/or metadata capture. Additional memory may be available for other hardware/firmware/software needs of the apparatus 130. The processor 132 may interface to the sensor controller module 140 in order to obtain and process sensory information for, e.g., object detection, face tracking, stereo vision, and/or other tasks.

The processor 132 may interface with the mechanical, electrical sensory, power, and user interface 146 modules via driver interfaces and/or software abstraction layers. Additional processing and memory capacity may be used to support these processes. It will be appreciated that these components may be fully controlled by the processor 132. In some implementation, one or more components may be operable by one or more other control processes (e.g., a GPS receiver may comprise a processing apparatus configured to provide position and/or motion information to the processor 132 in accordance with a given schedule (e.g., values of latitude, longitude, and elevation at 10 Hz)).

The memory and processing capacity may aid in management of processing configuration (e.g., loading, replacement), operations during a startup, and/or other operations. Consistent with the present disclosure, the various components of the system may be remotely disposed from one another, and/or aggregated. For example, one or more sensor components may be disposed distal from the capture device, e.g., such as shown and describe with respect to FIG. 1A. Multiple mechanical, sensory, or electrical units may be controlled by a learning apparatus via network/radio connectivity.

The apparatus 130 may include user interface (UI) module 146. The UI module 146 may comprise any type of device capable of registering inputs from and/or communicating outputs to a user. These may include, without limitation, display, touch, proximity sensitive interface, light, sound receiving/emitting devices, wired/wireless input devices and/or other devices. The UI module 146 may include a display, one or more tactile elements (e.g., buttons and/or virtual touch screen buttons), lights (LED), speaker, and/or other UI elements. The UI module 146 may be operable to receive user input and/or provide information to a user related to operation of the camera apparatus 130.

The apparatus 130 may include an input/output (I/O) interface module 148. The I/O interface module 148 may be configured to synchronize the capture device 130 with other cameras and/or with other external devices, such as a remote control, a second capture device 130, a smartphone, a client device 120 of FIG. 1A and/or a video server. The I/O interface module 148 may be configured to communicate information to/from various I/O components. In some implementations the I/O interface module 148 may comprise a wired and/or wireless communications interface (e.g. WiFi, Bluetooth, USB, HDMI, Wireless USB, Near Field Communication (NFC), Ethernet, a radio frequency transceiver, and/or other interfaces) configured to communicate to one or more external devices (e.g., device 120 in FIG. 1A and/or metadata source). In some implementations, the I/O interface module 148 may interface with LED lights, a display, a button, a microphone, speakers, and/or other I/O components. In one or more implementations, the I/O interface module 148 may interface to energy source, e.g., battery and/or DC electrical source. The communications interface of the apparatus 130 may include one or more connections to external computerized devices to allow for, inter alia, configuration and/or management of remote devices e.g., as described above with respect to FIG. 1A and/or with respect to FIGS. 2A-2B. The connections may include any of the wireless or wireline interfaces discussed above, and further may include customized or proprietary connections for specific applications. In some implementations, the communications interface may comprise a component (e.g., a dongle), comprising an infrared sensor, a radio frequency antenna, ultrasonic transducer, and/or other communications interfaces. In one or more implementations, the communications interface may comprise a local (e.g., Bluetooth, Wi-Fi) and/or broad range (e.g., cellular LTE) communications interface configured to enable communications between the capture device (e.g., 110 in FIG. 1A) and a remote device (e.g., 120 in FIG. 1A).

The apparatus 130 may include a power system that may be tailored to the needs of the application of the device. For example, for a small-sized lower power action camera, a wireless power solution (e.g. battery, solar cell, inductive (contactless) power source, rectification, and/or other) may be used.

Figure 2A:
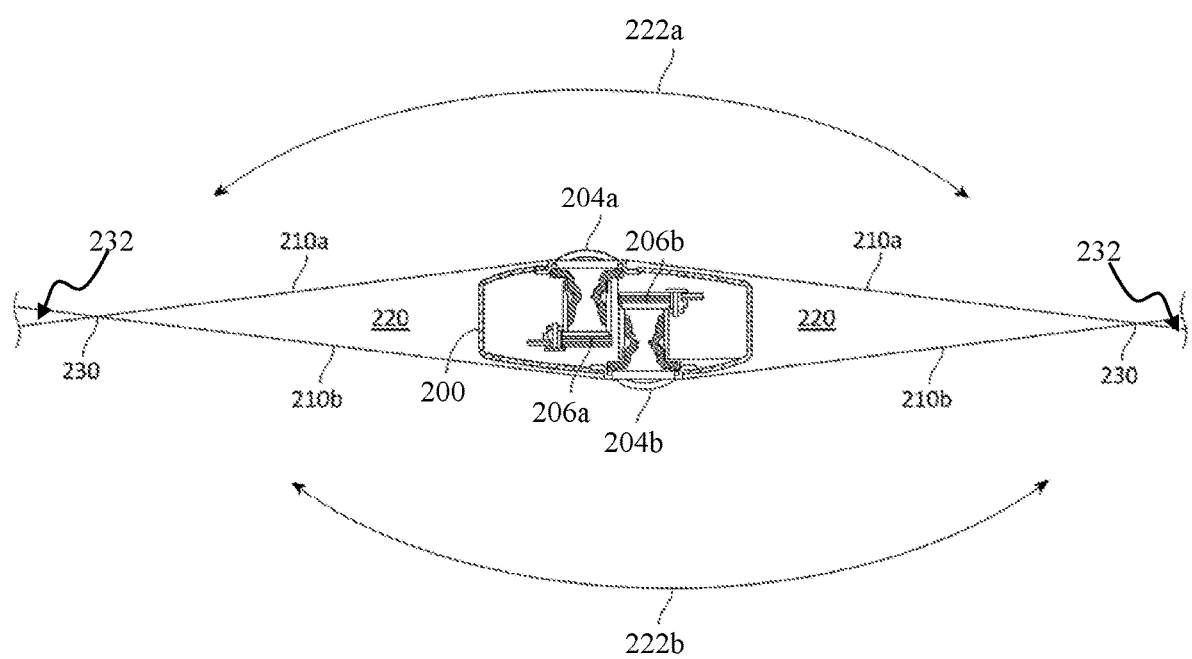
FIG. 2A is a graphical illustration depicting a field of view of a dual lens camera system configured for capturing spherical content in accordance with one implementation.

FIG. 2A illustrates a spherical image capture system 200 according to one implementation. A lens 204a of the spherical capture system 200 may be characterized by field of view 222a boundaries of which are denoted by lines 210a. An image sensor 206a may be configured to obtain a first hyper-hemispherical image by capturing light entering the lens 204a. A lens 204b of the spherical capture system 200 may be characterized by FOV 222b boundaries of which are denoted by lines 210b. An image sensor 206b may be configured to obtain a first hyper-hemispherical image by capturing light entering the lens 204b. Field of view 22a of the lens 204a may overlap with FOV 222b of the lens 204b. Intersection locations between FOV 222a, 222b are denoted by lines 230 in FIG. 2A. Intersection region may be referred to as the stitch line and/or stitch area.

Regions 232 outside of overlap or stitch points 230 may be referred to as the overlap regions. Content within the overlap regions 232 may be captured by the lens 204a and the lens 204b. A portion of an image obtained by the sensor 206a and corresponding to overlap regions 232 may be correlated and/or aligned with the image portion obtained by the sensor 206b in order to align the captured fields of view 222a, 222b and/or improve stitch quality when obtaining a spherical combined image.

As may be understood from FIG. 2A, a change in alignment (e.g., position, tilt, etc.) between the lenses 204a, 204b or their respective image sensors 206a, 206b may cause changes the relative positions of their respective fields of view 222a, 222b and/or the locations of stitch points 230. Stitch location may be obtained for a given pair of images during obtaining of spherical imaging content.

In some implementations, the spherical capture system 202 may be configured to maintain the location and orientation of the lenses 204a, 204b and their respective image sensors 206a, 206b within a given tolerance (e.g., less than 1 degree) to ensure that the desired fields of view 222a, 222b are captured and that the stitching algorithm may accurately and efficiently stitch the images together. For example, in one implementation, optical axes through the lenses 204a, 204b may be configured along parallel lines (e.g., within a predefined tolerance such as 1%, 3%, 5%, 10%, etc.), and the image sensors 206a, 206b are maintained substantially perpendicular (e.g., within a predefined tolerance such as 1%, 3%, 5%, 10%, etc.) to the optical axes through their respective lenses 204a, 204b.

As shown in FIG. 2A, in one implementation, the lenses 204a, 204b are positioned laterally offset from each other and off-center from a central axis of the spherical capture system 200. As compared to a camera with back-to-back lenses (e.g., lenses aligned along the same axis), the laterally offset lenses 204a, 204b enable the spherical capture system 200 to be built with substantially reduced thickness while still accommodating the lengths of the lens barrels securing the lenses 204a, 204b. For example, in one implementation, the overall thickness of the spherical capture system 200 may be close to the length of a single lens barrel as opposed to twice the length of a single lens barrel as would be needed in a back-to-back configuration. Furthermore, in one implementation, to achieve best overlap in the fields of view 222a, 222b of the lenses 204a, 204b, the lenses 204a, 204b are positioned as close together laterally as allowable by the lens structure.

In some implementations, images or frames captured by an image capture device, such as the capture apparatus 110 shown in FIGS. 1A/1B and the spherical capture system 200 shown in FIG. 2A, may be stitched together to produce a combined image, such as a spherical or panoramic image, which may be an equirectangular planar image. In some implementations, generating a combined image may include three-dimensional, or spatio-temporal, noise reduction (3DNR). In some implementations, pixels along the stitch boundary may be matched to reduce and/or altogether eliminate boundary discontinuities.

Figure 2B:
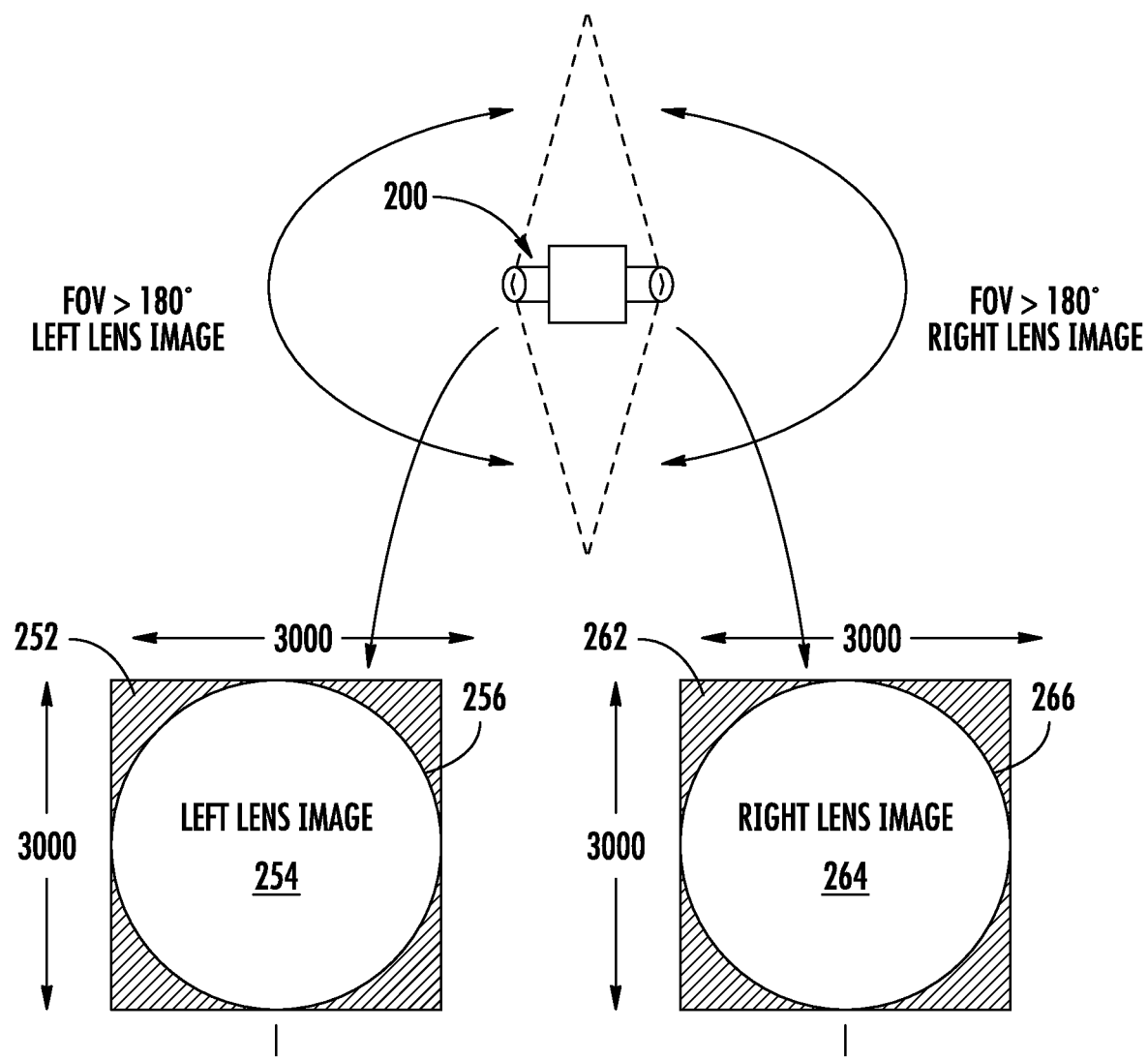
FIG. 2B is a graphical illustration depicting a capture of spherical images using a camera system of e.g., FIG. 2A in accordance with one implementation.

FIG. 2B is a graphical illustration depicting a capture of spherical images using a camera system of e.g., FIG. 2A in accordance with one implementation. Individual sensors of the capture device 200 may produce image frames 252, 262. Captured frames may include hemispherical images 254, 264 associated with fields of view 222a, 222b of FIG. 2A. As shown, the FOV may exceed 180 degrees, e.g., 195 degrees. The regions 256, 266 denote FOV boundaries of image frames 252, 262, respectively. The FOV boundaries 256, 266 in FIG. 2B may correspond to e.g., locations 230 in FIG. 2A. Individual images 252, 262 may include an array of pixels, e.g., 3000 pixels by 3000 pixels in one exemplary implementation. In some implementations, images 252, 262 may characterize left and right hemispheres of a 360 degree spherical FOV, other image configurations may be utilized, e.g., front/back, up/down, rotated, and/or other hemisphere configurations.

Individual images may be encoded using any applicable image and/or video codec, e.g., H.264, HEVC, and/or other codec. It will be recognized by those skilled in the arts that although the methodologies of the disclosure are illustrated herein using a dual-lens capture device, various other multi-camera capture configurations (e.g. 6-lens apparatus 110 of FIG. 1A, OMNI rig) may be employed for obtaining panoramic content using the methodologies described herein.

Figure 4A:
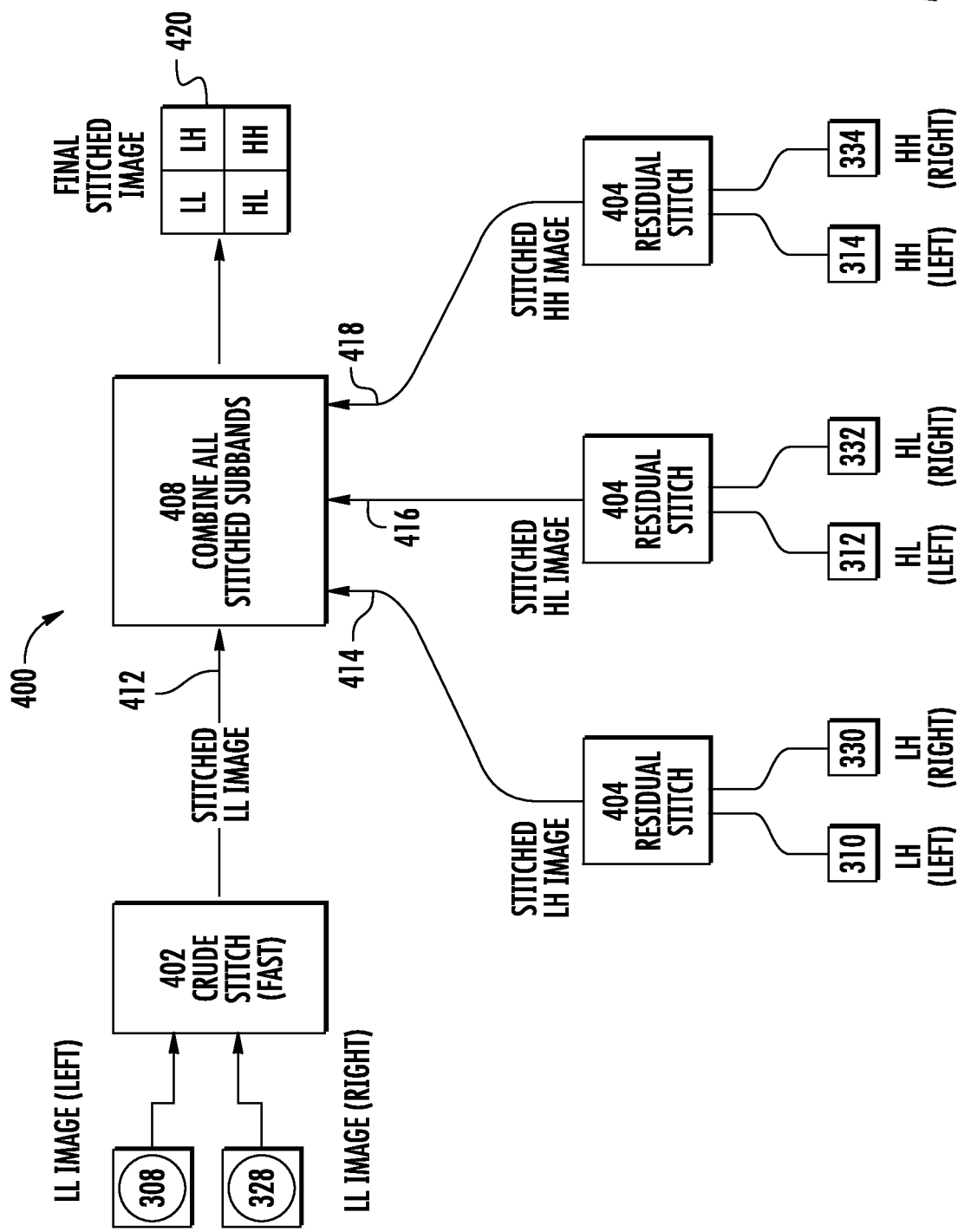
FIG. 4A is a flow diagram of one exemplary process for stitching images encoded using wavelet based multiscale decomposition, in accordance with some implementations.
Figure 4B:
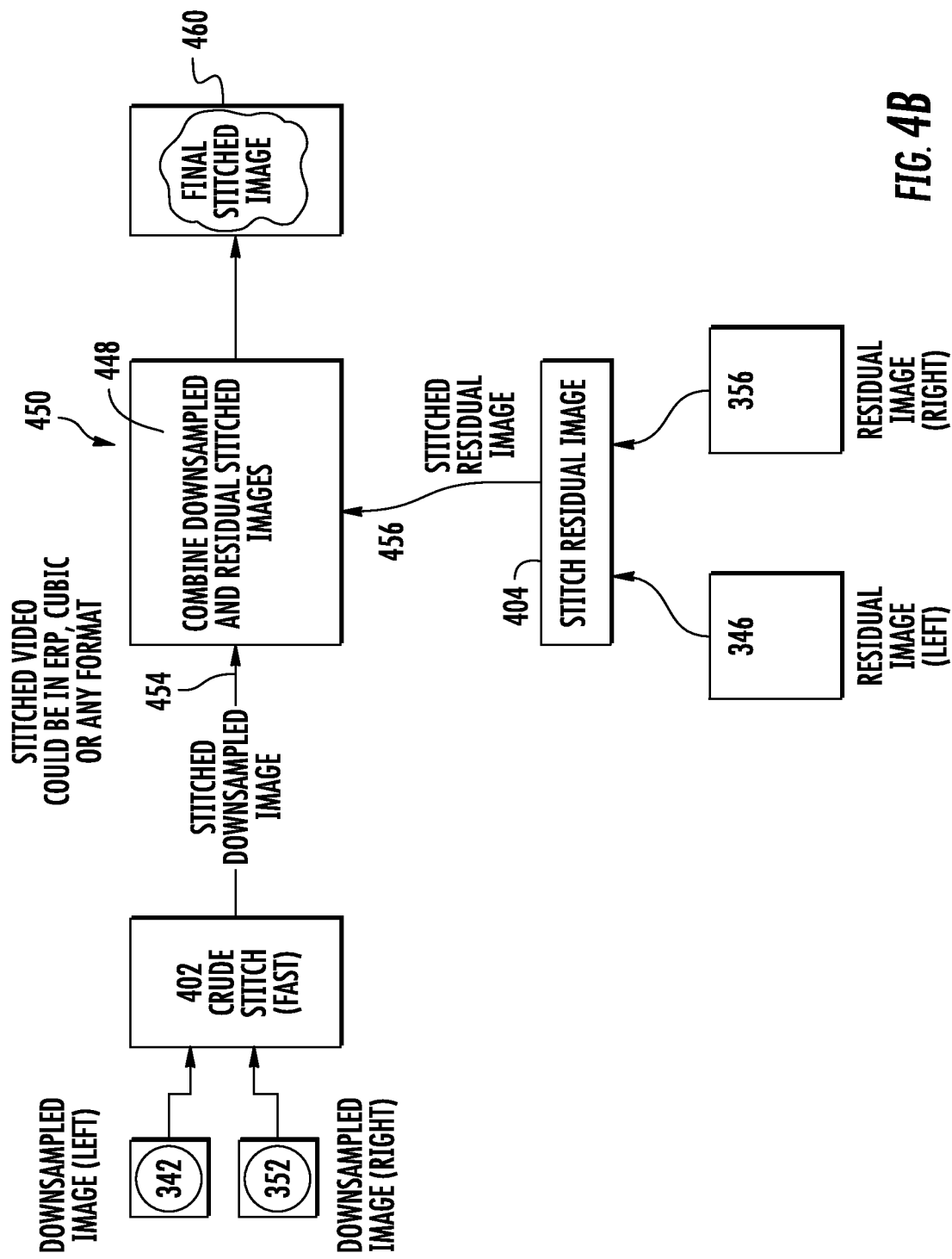
FIG. 4B is a flow diagram of one exemplary process for stitching images encoded using multiscale decomposition, in accordance with some implementations.

Individual images 252, 262, representing two hemispheres, may be stitched along a 180 degree FOV boundary to obtain a spherical (e.g., 360 degree) image using the methodologies described herein, e.g., with respect to FIGS. 4A-4B. In some implementations, images obtained with a FOV greater than 180 degree may include an area of overlap wherein a portion of the visual field may be visible to both lenses and appear in both images. Pixels at and/or proximate to the FOV boundary and/or within the overlap area may be modified during stitching.

Figure 3A:
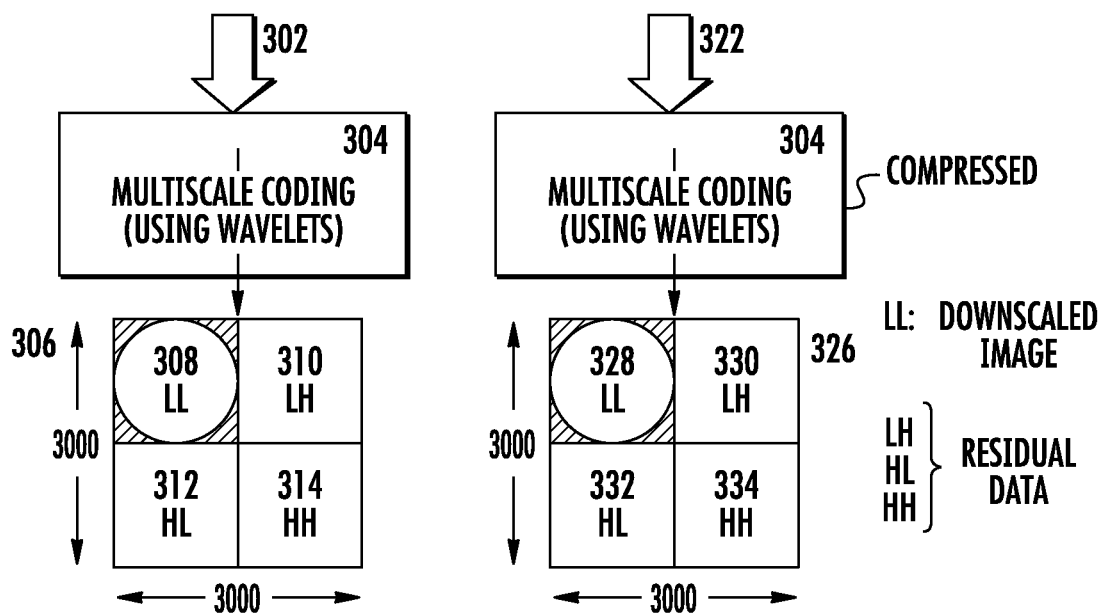
FIG. 3A illustrates a wavelet based multiscale decomposition of imaging content captured with a dual-lens configuration, in accordance with some implementations.

FIG. 3A illustrates a wavelet based multiscale decomposition of imaging content captured with a dual-lens configuration for use with stitching methodology of FIG. 4A, in accordance with some implementations.

Input images 302, 322 may correspond to a source or encoded versions of images 252, 262 described with respect to FIG. 2B. Input 302, 322 may be decomposed (encoded) into multiscale components using wavelet decomposition components 304. In some implementations, a given wavelet decomposition component may be configured to process input 302 and 322.

The output of the wavelet decomposition may include encoded output frames 306, 326. Individual output frames 306, 326 may be characterized by dimensions of the input 302, 322 (e.g., 3000 pixels by 3000 pixels in one implementation). Output frames 306, 326 may include four component images as follows: components 308, 328 (that also may be referred to as 'LL') may characterize low frequency energy of the input 302, 322 along both image dimensions (e.g., vertical and horizontal dimensions); components 310, 330 (that also may be referred to as 'LH') may characterize low frequency (large scale) energy of the input 302, 322 along one image dimension (e.g., vertical) and high frequency (small scale) energy of the input 302, 322 along another image direction (horizontal); components 312, 332 (that also may be referred to as 'HL') may characterize high frequency energy of the input 302, 322 along one image dimension (e.g., vertical) and low frequency energy of the input 302, 322 along another image direction (horizontal); and components 314, 334 (that also may be referred to as 'HH') may characterize high frequency energy of the input 302, 322 along two image dimensions (e.g., horizontal and vertical). In some implementations, LL components 308, 330 may approximate versions of the input images at half the resolution; LH components 310, 330 may be configured to contain information related to vertical edges within the input 302, 322, HL components 312, 332 may be configured to contain information related to horizontal edges within the input 302, 322, and HH components 312, 332 may be configured to contain information related to diagonal edges within the input 302, 322. In one or more implementations, LL components 308, 330 may provide downsampled output versions of the input images, 302, 322; whereas the LH, HL, HH components 310, 330, 312, 332, 314, 334 may provide residual information between the input and the downsampled output 308, 328.

Representations shown in FIG. 3A may correspond to a single level wavelet decomposition. In some implementations, multilevel (e.g., two level, three level) decomposition may be utilized, wherein LL blocks 308, 328 may be further subdivided into components.

Figure 5:
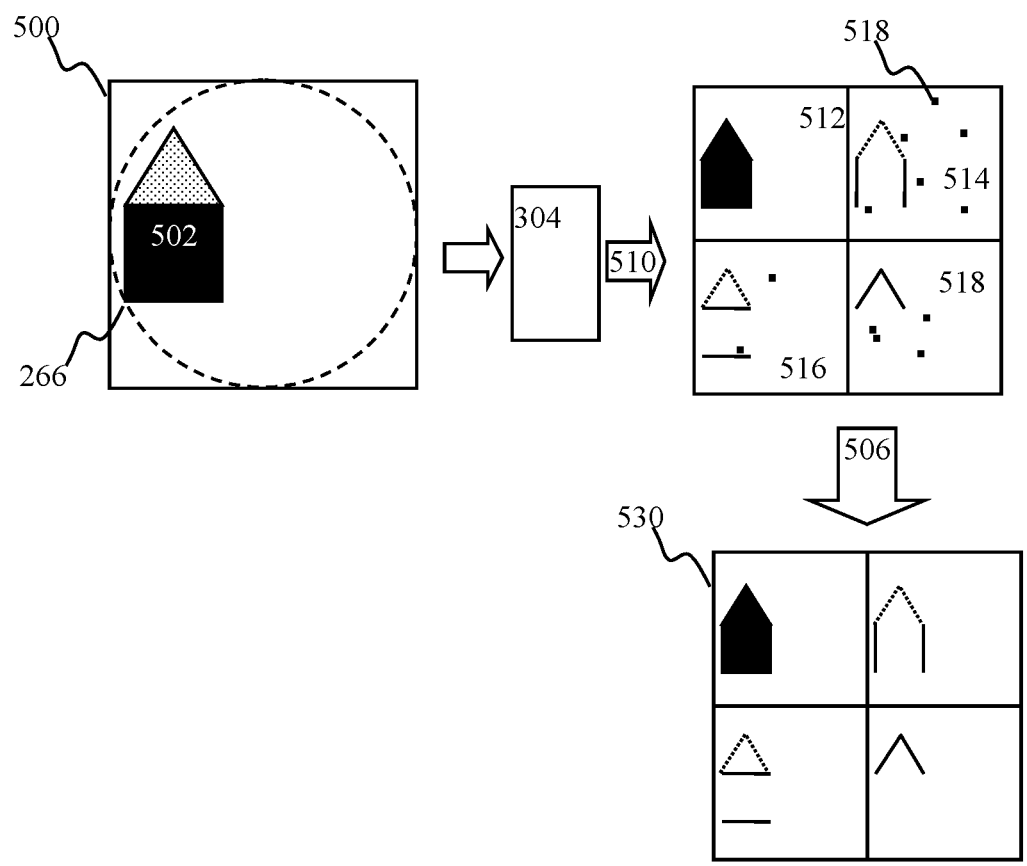
FIG. 5 illustrates an exemplary image decomposition and thresholding for use with the multi-resolution stitching methodology of the disclosure.

FIG. 5 illustrates an exemplary wavelet decomposition of an image. The image 500 may correspond to one of the source and/or encoded images (e.g., 252, 262 in FIG. 2B). The image 500 may include an object 502 (as shown, a house). The image 500 may be decomposed by, e.g., the wavelet decomposition component 304 described with respect to FIG. 3A. The output 504 of the wavelet decomposition may include image components at multiple resolutions, e.g., component 512 may correspond to a downsampled version of the image 500, components 514, 516, 518 may correspond to low frequency and/or high frequency content of the image 500 along one or more dimensions, (e.g., such as LH, HL, HH components described with respect to FIG. 3A). As illustrated in FIG. 5, the LL component 512 may include information related to the low frequency content of the image (e.g., house); the LH component 514 may characterize vertical edges within the image 500; the HL component 516 may characterize horizontal edges within the image 500; and the HH component 514 may characterize diagonal edges within the image 500. The output of the decomposition may include noise (e.g., sensor noise within the image 500) shown by pixels 518. A filtering operation 506 (e.g., thresholding) may be applied to components of the decomposed image (e.g., the components 514, 516, 518) to remove noise, the resulting output of the filtering operation is shown by panel 530.

FIG. 4A illustrates a system for stitching images using a wavelet based multiscale decomposition, in accordance with some implementations.

In FIG. 4A, an input into the system 400 may be provided by the wavelet decomposition components 304 of FIG. 4A. Input 308, 328 may correspond to LL wavelet components representing downsampled-by-2 versions of the image input 302, 322; LL components capture the low-frequency information of the input image. Input component LH, HL and HH 310, 330, 312, 332, 314, 334 (also called residual data) capture high frequency details of the input 302, 322 along the various dimensions (e.g., vertical and/or horizontal). Residual components may also include areas with values having low energy levels, compared to mean and/or maximum energy levels within the component. In some implementations, the values of components 310, 330, 312, 332, 314, 334 that fall below a threshold level, may be set to a background level value (e.g., zero in some implementations).

In some implementations, the image stitching system 400 of FIG. 4A may include multiple stitching components (stitchers): a coarse stitcher 402 and fine stitchers 404. In some implementations a given instance of the fine stitcher 404 may be configured to process (stitch) multiple components of the input (e.g., the HL, LH, and/or HH components). In one or more implementations, a given stitcher may be configurable to operate in multiple modes to implement fine and coarse stitching functionality (e.g., LL components and/or one or more of HL, LH, and/or HH components). In some cases, the coarse stitcher may be characterized by lower resource use (e.g., energy, number of computations, number of computing elements, memory, and/or other resource) and/or faster stitch time compared to the fine stitcher for the same size of images being stitched. However, it is appreciated that other implementations may allocate (or be designed) with equivalent or even higher resource use for the fine stitchers, the foregoing allocation being purely illustrative.

In FIG. 4A, LL components 308, 328 may be stitched using a coarse stitcher 402. In some implementations, the coarse stitching operation may include one or more of: (i) cutting and merging image data wherein source images are warped to match the field of view boundaries, and placed side by side in an equirectangular format; (ii) cutting and feathering wherein pixels that are output from the cut and merge operation which are in an overlapping area may be smoothed (spatially averaged) so as to reduce stitching artifacts; (iii) thresholding; and/or (iv) depth-based stitching operations that may include evaluating pixels within the overlapping region in order to obtain a depth map of objects within the region. For distant objects, the stitching operation may include cutting and merging and/or cutting and feathering. For close objects, a stretch/move operation may be applied in order to align pixels from two images corresponding to a given location; subsequently cut and merge and/or cut and feather may be applied. The amount of stretch and/or move may be configured as a function of lens separation and/or lens geometry (e.g., FOV). It will be recognized by those skilled in the arts that the above stitching methods are exemplary and other stitching approaches may be utilized. More generally, a given stitching operation may be selected for a given image resolution to optimize and/or balance between video quality, stitch speed, computational load and energy use.

Residual components LH, HL, and HH 310, 330, 312, 332, 314, 334 may be stitched using a fine stitching process 404. In some implementations, the fine stitching operation may be configured based on blending, median filtering, and/or other depth-based stitching approaches. Residual components (e.g., 310, 330, 312, 332, 314, 334) may include multiple low energy (and/or zero) values. Stitching component (e.g., 404 in FIG. 4A) may be configured to ignore image pixels with values below a given threshold. A thresholding operation may be configured to remove noise and/or other artifacts, e.g., as shown by arrow 506 in FIG. 5. As illustrated in FIG. 5, residual components (e.g., 512, 514, 516, 518) may include larger portions of low/zero value pixels and smaller portions of non-trivial (e.g., above threshold) pixels. When stitching an image with a smaller portion of non-zero pixels, more complex algorithms may be utilized (e.g., by the stitcher 404) so as to obtain greater quality stitch compared to stitch performance of the coarse stitcher 402. Even though per-pixel resource use of the fine stitcher 404, may be greater than that of the coarse stitcher 402, the fine stitcher may be configured to operate on fewer pixels compared to the coarse stitcher 402 and/or a full image fine stitcher. Accordingly, multiscale stitching of image components (e.g., 512, 514, 516, 518 of FIG. 5) may result in a lower resource use for a given quality and/or a greater stitching quality for a given resource as compared to stitching of the whole image (e.g., 500) by either a fine stitcher or a coarse stitcher.

Returning now to FIG. 4A, output 412, 414, 416, 418 of stitchers 402, 404 may be combined by the full image combiner/stitcher 408 to produce a stitched image 420 in a multiresolution (wavelet) domain. In some implementations, the combination may include image transformation to the pixel domain from the wavelet domain, pixel combination within the pixel domain, and transformation back into the wavelet domain from the pixel domain. In one or more implementations, the combination may be effectuated in the wavelet domain and include normalization operations to maintain orthonormal properties of the wavelet components and/or reduce image distortion and/or coefficient imbalances. The stitching components (e.g., 402, 404) may be configured to apply algorithms in the wavelet domain so as to minimize artifacts like ringing and "blockiness" (blocking artifacts) in the final pixel domain image.

Figure 3B:
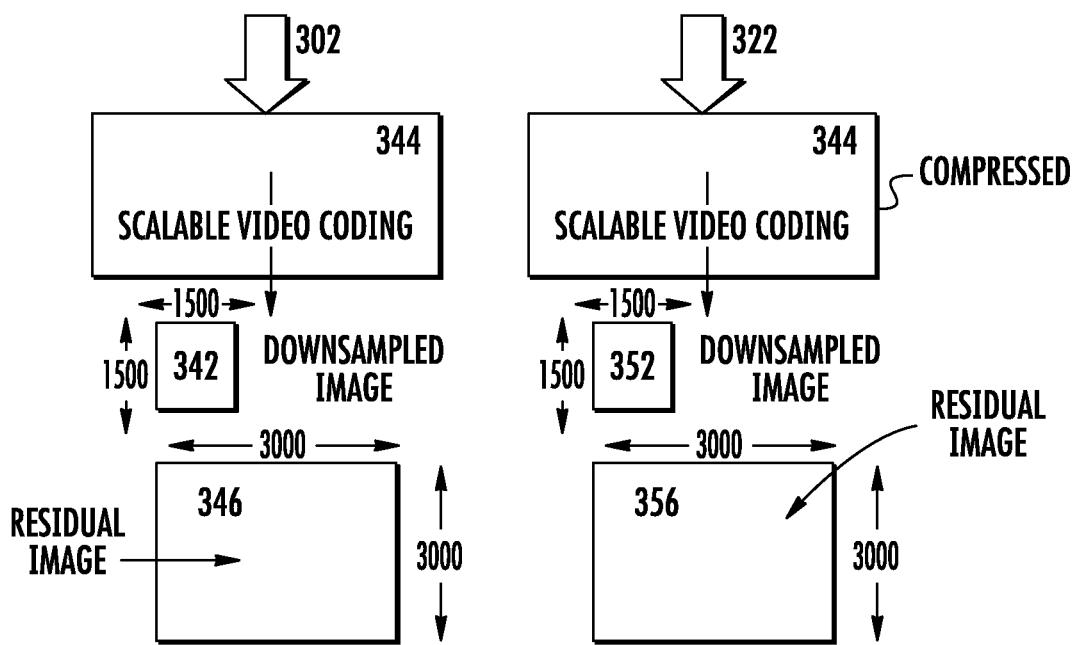
FIG. 3B illustrates a multiscale decomposition of content obtained with a dual lens capture system, in accordance with some implementations.

FIG. 3B illustrates a multiscale decomposition of content obtained with a dual lens capture system, in accordance with some implementations.

Input 302, 322 in FIG. 3A may be decomposed (encoded) into multiscale components using scalable video coding components 344. In some implementations, the operation of the components 344 may be configured in accordance with the methodology described in U.S. patent application Ser. No. 15/250,748, entitled "APPARATUS AND METHODS FOR VIDEO COMPRESSION USING MULTI-RESOLUTION SCALABLE CODING" filed on Aug. 29, 2016, the foregoing being incorporated herein by reference in its entirety.

The output of the scalable decomposition 344 may include multiple image components at multiple resolutions. As shown in FIG. 3B, input 302 may be encoded into a downsampled image 342 and residual image 346. The downsampled image, in some implementations, may be obtained by downsampling the input 302 by a factor of 2 (e.g., to obtain 1500 pixels by 1500 pixels (output 342) from 3000 pixels by 3000 pixels (input 302)); residual image 346 may be characterized by dimensions matching dimensions of the input 302. Input 322 in FIG. 3B may be encoded into a downsampled image 352 and a residual image 356. The downsampled image 352, in some implementations, may be obtained by downsampling the input 322 by a factor of 2 (e.g., to obtain 1500 pixels by 1500 pixels (output 352) from 3000 pixels by 3000 pixels (input 322)); residual image 356 may be characterized by dimensions matching dimensions of the input 322.

FIG. 4B illustrates a system for stitching images using scalable video coding, in accordance with some implementations.

In FIG. 4B, input into the system 450 may be provided by the scalable decomposition components 344 of FIG. 4B. Input 342, 352 in FIG. 4B may correspond to the downsampled version of the inputs 302, 322 described with respect to FIG. 3B. Input 346, 356 in FIG. 4B may correspond to the residual outputs of encoded input 302, 322 described with respect to FIG. 3B. The downsampled input versions 342, 352 may capture the low-frequency information of the input images 302, 322. Residual components 346, 356 may capture high frequency details of the input images 302, 322. Residual components may include areas with values having low energy levels, compared to mean and/or maximum energy levels within the component. In some implementations, values of components 346, 356 that fall below a given level, may be set to a background level value (e.g., zero in some implementations).

In some implementations, the image stitching system 450 of FIG. 4B may include multiple stitching components (stitchers): a coarse stitcher (e.g., stitcher 402 described with respect to FIG. 4A) and a fine stitcher (e.g., stitcher 404 described with respect to FIG. 4A).

In FIG. 4B, the encoded image components 342, 352 may be stitched using a coarse stitcher 402. In some implementations, the coarse stitching operation may incorporate feathering, thresholding, de-warped image merging, and/or other approaches. Residual components 346, 356 in FIG. 4B, may be stitched using a fine stitching process 404. In some implementations, the fine stitching operation may be configured based on blending, median filtering, and/or other depth-based stitching approaches. As previously noted, residual components 346, 356 may include multiple low energy (and/or zero) values; thus, the stitching component (e.g., 404 in FIG. 4A) may be configured to ignore values below a given threshold. A thresholding operation may be configured to remove noise and/or other artifacts, e.g., as described with respect to FIG. 5. When stitching an image with a smaller portion of non-zero pixels, some more complex algorithms may be utilized (e.g., by the fine stitcher 404) so as to obtain greater quality stitching results compared to stitching performance of the coarse stitcher 402. Even though the per-pixel resource use of the fine stitcher 404, may be greater than that of the coarse stitcher 402, the fine stitcher may be configured to operate on fewer pixels compared to the coarse stitcher 402 and/or a full image fine stitcher. Accordingly, the multiscale stitching of image components (e.g., 512, 514, 516, 518 of FIG. 5) may result in a lower resource use for a given quality and/or a greater stitching quality for a given resource as compared to stitching of the whole image (e.g., 500) by either a fine stitcher or a coarse stitcher.

Returning now to FIG. 4B, the output 454, 456 of stitchers 402, 404 may be combined by the full image stitcher/combiner component 448 to produce a stitched image 460 in a multiresolution (wavelet) domain. In some implementations, the combination may include upsampling the downsampled stitched output 454 to the resolution of the final stitched output (e.g., full resolution), and combining the upsampled version with the residual stitched images 456.

Figure 6:
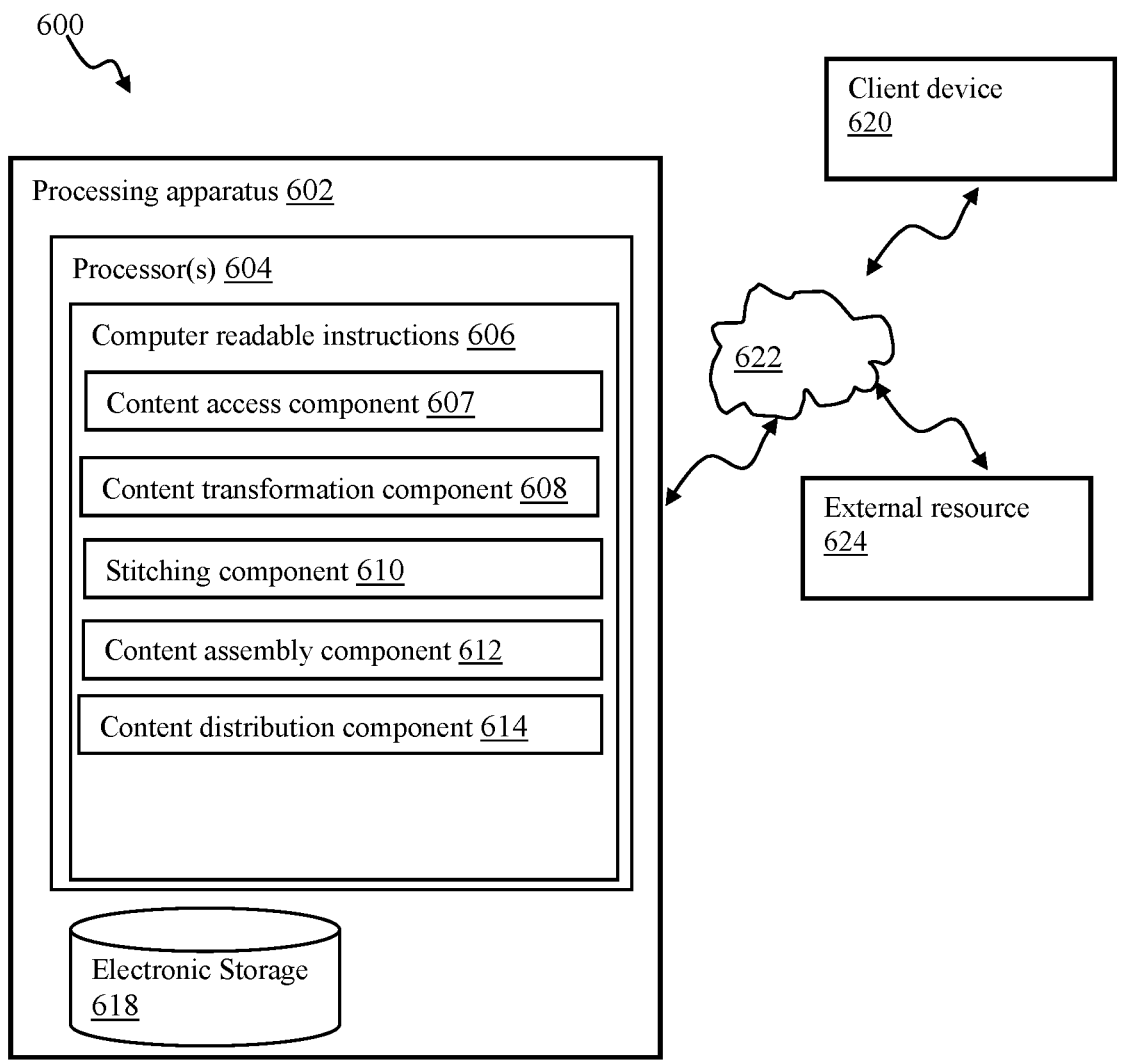
FIG. 6 is a functional block diagram illustrating a system for obtaining imaging content using the multi-resolution stitching methodology of the disclosure.

FIG. 6 illustrates a computerized system for obtaining imaging content using multi-resolution stitching methodology of the disclosure. In some implementations, the system 600 may be configured to encode panoramic and/or VR content as a part of content acquisition and/or content delivery by a capture device (e.g., 110 in FIG. 1A and/or 200 in FIG. 2A). In one or more implementations, the system 600 may be configured to encode content during and/or as a part of content upload and/or playback of previously acquired content.

The system 600 of FIG. 6 may include a processing apparatus 602 (e.g., including capture device 110 of FIG. 1A, 130 of FIG. 1B, a computing device in communications with a capture device and/or content depository, a cloud computing apparatus, and/or other apparatus) configured to obtain audio and/or imaging content, e.g., video and/or photos. Content depository may include a network attached storage (NAS), a portable storage (e.g., flash memory), a cloud storage, a server, a personal computer, a DVR, and/or other storage configuration.

The apparatus 602 may be in operable communication with one or more remote client devices 620 via one or more electronic communications interface 622. The interface 622 may include one or more wired interfaces (e.g., serial, USB, Thunderbolt™, HDMI, Ethernet, and/or other wired interfaces) and/or wireless interfaces (e.g., WiFi, Bluetooth, cellular, and/or other air interfaces). For example, such electronic communication links may be established, at least in part, via one or more networks. In some implementations, a network may comprise the Internet and/or may employ other communications technologies and/or protocols. By way of non-limiting example, the interface 622 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 622 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over the interface 622 may be represented using formats including one or more of hypertext markup language (HTML), extensible markup language (XML), and/or other formats. One or more exchanges of information between entities of system 100 may be encrypted using encryption technologies including one or more of secure sockets layer (SSL), transport layer security (TLS), virtual private networks (VPNs), Internet Protocol security (IPsec), and/or other encryption technologies. In some implementations, one or more entities of system 600 may use custom and/or dedicated data communications technologies instead of, or in addition to, the ones described above.

The remote device 620 may include a user interface device, one or more of a portable communications device (e.g., smartphone, a digital camera, a laptop, a tablet computer, a desktop computer, a television set-top box, a smart TV, a gaming console, a client computing platform, and/or other platforms), a capture device (e.g., a camera), and/or other device configured to communicate information with the processing apparatus 602. In some implementations, the system 600 may include multiple capture devices, e.g., configured for obtaining panoramic content e.g., such as described in U.S. patent application Ser. No. 14/927,343 entitled "APPARATUS AND METHODS FOR ROLLING SHUTTER COMPENSATION FOR MULTI-CAMERA SYSTEMS" filed on Oct. 29, 2015, incorporated supra.

The apparatus 602 may include one or more physical processors 604 configured by machine-readable instructions 606 and/or other components. Executing the machine-readable instructions 606 may cause the one or more physical processors 604 to effectuate encoding of content using the methodologies of the disclosure. The machine-readable instructions 606 may include one or more of content access component 607, content transformation component 608, stitching component 610, content assembly component 612, content distribution component 614, and/or other components.

One or more features and/or functions of the apparatus 602 may facilitate video content acquisition, generation and/or provision of imaging content. It is noted that although the present disclosure is directed to videos and/or video clips, one or more other implementations of system 600 and/or apparatus 602 may be configured for other types of media items. By way of non-limiting example, other types of media items may include one or more of audio files (e.g., music, podcasts, audio books, and/or other audio files), documents, photos, multimedia presentations, digital purchases of goods and services, and/or other media items.

The apparatus 602 may include electronic storage 618. The apparatus 602 may include communication lines or ports to enable the exchange of information with a network and/or other entities. The illustration of apparatus 602 in FIG. 6 is not intended to be limiting. The apparatus 602 may include a plurality of hardware, software, and/or firmware components operating together to provide the functionality attributed herein to apparatus 602. For example, the apparatus 602 may be implemented by a cloud of computing platforms operating together as apparatus 602.

The electronic storage 618 may comprise electronic storage media that electronically stores information. The electronic storage media of electronic storage 618 may include one or both of system storage that is provided integrally (i.e., substantially non-removable) with apparatus 602 and/or removable storage that is removably connectable to apparatus 602 via, for example, a port or a drive. A port may include a USB port, a FireWire port, and/or other port. A drive may include a disk drive and/or other drive. Electronic storage 618 may include one or more of optically readable storage media (e.g., optical disks, etc.), magnetically readable storage media (e.g., magnetic tape, magnetic hard drive, floppy drive, and/or other magnetic storage media), electrical charge-based storage media (e.g., EEPROM, RAM, etc.), solid-state storage media (e.g., flash drive, etc.), and/or other electronically readable storage media. The electronic storage 618 may include one or more virtual storage resources (e.g., cloud storage, a virtual private network, and/or other virtual storage resources). The electronic storage 618 may be configured to store software algorithms, information determined by processor(s) 604, information received from apparatus 602, information received from external resource(s) 624, and/or other information that enables apparatus 602 to function as described herein. In some implementations, the electronic storage 618 may be configured to store encoded image output (e.g., output 420, 460 in FIGS. 4A-4B).

The system 600 may include an external resource(s) 624 operably linked via one or more electronic communication interfaces 622. External resource(s) 624 may include sources of information, hosts, and/or other entities outside of system 600, external entities participating with system 600, computing platforms, and/or other resources. In some implementations, some or all of the functionality attributed herein to external resources may be provided by resources included in system 600.

It will be appreciated that this is not intended to be limiting and that the scope of this disclosure includes implementations in which apparatus 602, external resources, and/or other entities may be operatively linked via some other communication media.

The processor(s) 604 may be configured to provide information-processing capabilities in apparatus 602. As such, processor 604 may include one or more of a digital processor, an analog processor, a digital circuit designed to process information, an analog circuit designed to process information, a state machine, and/or other mechanisms for electronically processing information. Although processor 604 is shown in FIG. 6 as a single entity, this is for illustrative purposes only. In some implementations, processor 604 may include one or more processing units. These processing units may be physically located within the same device, or processor 604 may represent processing functionality of a plurality of devices operating in coordination. The processor 604 may be configured to execute components 607, 608, 610, 612, and/or 614. The processor 604 may be configured to execute components 607, 608, 610, 612, and/or 614 by software; hardware; firmware; some combination of software, hardware, and/or firmware; and/or other mechanisms for configuring processing capabilities on processor 604.

It should be appreciated that although components 607, 608, 610, 612, and/or 614 are illustrated in FIG. 6 as being co-located within a single processing unit, in implementations in which processor 604 includes multiple processing units, one or more of components 607, 608, 610, 612, and/or 614 may be located remotely from the other components. The description of the functionality provided by the different 607, 608, 610, 612, and/or 614 described above is for illustrative purposes and is not intended to be limiting, as any of components 607, 608, 610, 612, and/or 614 may provide more or less functionality than is described. For example, one or more of components 607, 608, 610, 612, and/or 614 may be eliminated, and some or all of its functionality may be provided by other ones of components 607, 608, 610, 612, and/or 614 and/or other components. As an example, processor 604 may be configured to execute one or more additional components that may perform some or all of the functionality attributed below to one of components 607, 608, 610, 612, and/or 614.

In FIG. 6, the content access component 607 may be configured to access and/or manage image and/or audio content. In some implementations, the component 607 may be configured to effectuate image/audio content acquisition using any applicable methodologies including those described herein. By way of an illustration, the component 607 may be operable to instantiate content acquisition by, e.g., the capture device 200 of FIG. 2A, based on a timer event, user instruction, or a sensor event.

In some implementations, the component 607 may be operable to access previously acquired content from electronic storage 618 and/or external resource(s) 624 (e.g., external storage, and/or remote user device during content upload). The operations performed by the content component 607 may include information timestamping, adjustment of data rate, transcoding, post processing (e.g., adjusting white balance, sharpening, contrast, gamma and/or other parameters), trimming, and/or other operations. In some implementations, the image/audio content and the metadata may be stored in a multimedia storage container (e.g., MP4, MOV) such as described in detail in U.S. patent application Ser. No. 14/920,427, entitled "APPARATUS AND METHODS FOR EMBEDDING METADATA INTO VIDEO STREAM" filed on Oct. 22, 2015, incorporated supra, and/or in a session container (e.g., such as described in detail in U.S. patent application Ser. No. 15/001,038, entitled "STORAGE OF METADATA AND IMAGES" filed on Jan. 19, 2016, the foregoing being incorporated herein by reference in its entirety).

In FIG. 6, the transformation component 608 may be configured to transform content accessed by the component 607. In some implementations, the content transformation may include wavelet based image decomposition e.g., such as described with respect to FIGS. 3A and/or 5. In one or more implementations the transformation may include scalable video coding operations, e.g., such as described with respect to FIG. 3B and/or in US. Provisional Patent Application Ser. No. 62/310,550, entitled "APPARATUS AND METHODS FOR VIDEO COMPRESSION USING MULTI-RESOLUTION SCALABLE CODING" filed on Mar. 18, 2016 the foregoing being incorporated herein by reference in its entirety. Content transformation component may be configured to process two or more images (e.g., 252, 262 of FIG. 2B) and to obtain (for a given processed image) two or more image components characterized by their respective resolution. Output of the transformation process may include images 306, 326 of FIG. 3A, 342, 346, 352, 356 of FIG. 3B.

In FIG. 6, the stitching component 610 may be configured to effectuate stitching of transformed imaging content. In some implementations, the stitching operations may include pixel level stitching of respective components of two hemispherical images including, e.g., determination of an overlap area between the images, determination of pixel locations at and/or proximate boundary area (e.g. denoted by line 256, 266 in FIG. 2A), image warp, pixel blend, and/or other operations. Stitching component 610 may be configured to effectuate coarse stitching operation (e.g., 402 of FIGS. 4A-4B) and fine stitching operation (e.g., 404 of FIG. 4A-4B). The stitching component 610 may be operable to effectuate coarse stitching of lower resolution image components, e.g., LL components 308, 328 in FIG. 3A and/or 342, 352 in FIG. 3B. Stitching component 610 may be operable to effectuate fine stitching of higher resolution image components, e.g., LH, HL, and/or HH components 310, 330, 312, 332, 314, 334 in FIG. 3A and/or 346, 356 in FIG. 3B. In some implementations, the coarse stitching operation may include one or more of: (i) cutting and merging wherein source images are warped to match field of view boundaries, and placed side by side in equirectangular format; (ii) cutting and feathering where an output of the cut and merge operation that is in an overlapping area may be smoothed (spatially averaged) so as to reduce stitching artifacts; (iii) thresholding; and/or (iv) depth-based stitching operations that may include evaluating pixels within the overlap region in order to obtain a depth map of objects within the region. For distant objects, the stitch operation may include cut and merge and/or cut and feather. For close objects, a stretch/move operation may be applied in order to align pixels from two images corresponding to a given location; subsequently thereafter cut and merge and/or cut and feather may be applied. The amount of stretch and/or move may be configured as a function of lens separation and/or lens geometry (e.g., FOV). It will be recognized by those skilled in the arts that the foregoing stitching methods are exemplary and other stitching approaches may be utilized. More generally, a given stitching operation may be selected for a given image resolution so as to optimize balance between video quality, stitch speed, computational load and energy use.

In FIG. 6, the content assembly component 612, may be configured to combine stitched image components (e.g., such as obtained by component 610) to obtain stitched image output. The content assembly component 612 may be configured to combine stitched image components of two or more resolutions. In some implementations of wavelet-based image coding, component 612 may be configured to combine multiple stitched wavelet components, e.g., LL, LH, HL, HH. In one or more implementations of scalable image coding, e.g., such as described with respect to FIGS. 3B and 4B, the image component 612 may be configured to combine multiple stitched components, e.g., downsampled component 454 and residual component 456 described with respect to FIG. 4B. Component 612 may be configured to obtain a stitched image content, e.g., 420, 460 of FIGS. 4A-4B.

In FIG. 6, the content distribution component 614, may be configured to provide the stitched image content, e.g., such as obtained by component 612. The content provision may include storing the content on the storage component 618 for viewing; broadcasting content, and/or otherwise delivering content to one or more client devices (e.g., the remote device 620 (e.g., smartphone), screen of a user interface device, and/or external resource (e.g., cloud storage)), and/or other operations.

Figure 7:
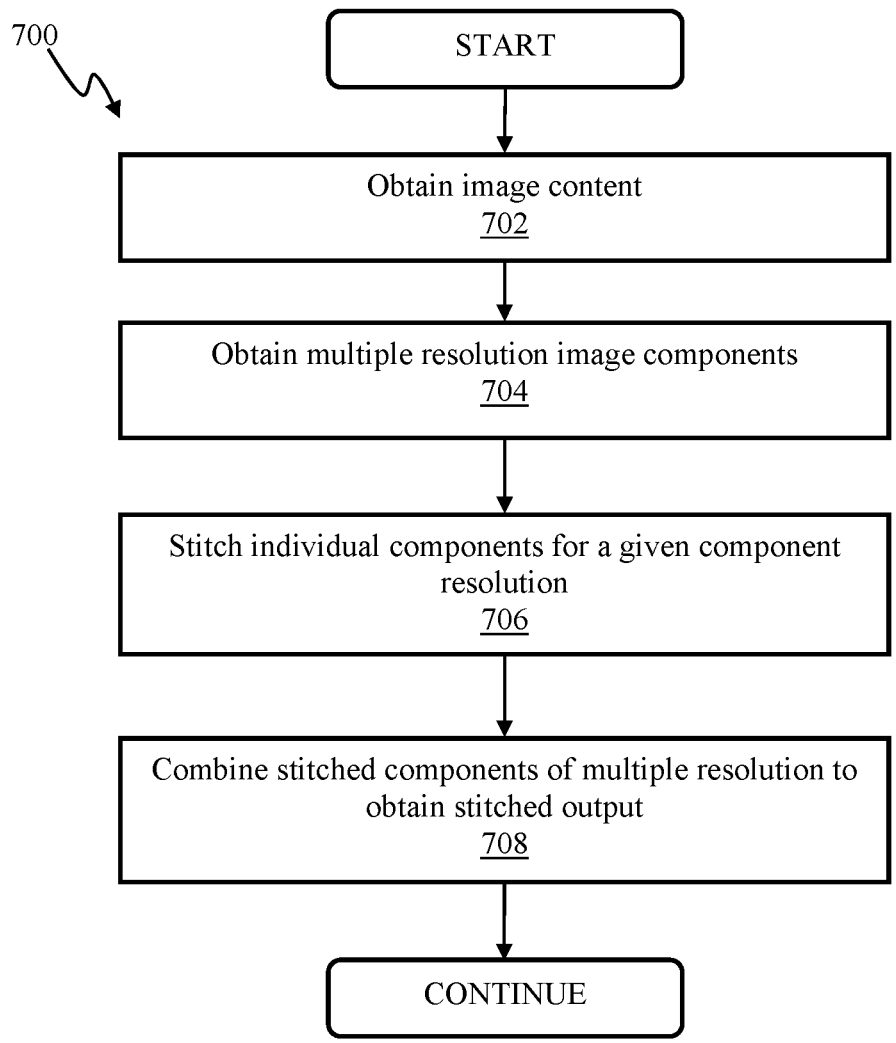
FIG. 7 is a logical flow diagram illustrating a method for multi-resolution image stitching in accordance with some implementations.

FIG. 7 illustrates a method for multi-resolution image stitching in accordance with some implementations. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below is not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700. Operations of method 700 may be effectuated by one or more devices and/or computerized systems including these described with respect to FIGS. 1A-1B, FIG. 2A, and/or FIG. 6.

FIG. 7 is logical flow diagram illustrating a method of obtaining panoramic content in accordance with one implementation of the present disclosure. Method 700 of FIG. 7 may be implemented by, e.g., system 600 of FIG. 6. In some implementations, operations of method 700 may be effectuated by a capture device (e.g., 200 of FIG. 2A) during and/or as a part of imaging content acquisition.

At operation 702 of method 700 image content may be obtained. In some implementations, the content may include a sequence of high resolution images (e.g., 4K, 8K, and/or other resolution) captured and encoded by a capture device (e.g., 200 of FIG. 2A) and/or obtained from a content storage entity. In one or more implementations, the content may correspond to spherical content (e.g., pairs of hemispherical images 252, 262) obtained by a capture device (e.g., 200 of FIG. 2 and/or 110 of FIG. 1A).

At operation 704, individual images may be encoded into components characterized by a given resolution such the encoding of a given image may produce two or more image components characterized by different resolutions. In some implementations, left/right images obtained with imaging apparatus 200 of FIG. 2 may be transformed using wavelet-based decomposition to obtain image components (e.g., LL, LH, HL, HH components 308, 310, 312, 314) such as described with respect to FIG. 3A and/or FIG. 4A. In some implementations, left/right images obtained with the imaging apparatus 200 of FIG. 2 may be transformed using scalable video coding methodology, e.g., such as described with respect to FIG. 3B and/or in U.S. Provisional Patent Application Ser. No. 62/310,550, entitled "APPARATUS AND METHODS FOR VIDEO COMPRESSION USING MULTI-RESOLUTION SCALABLE CODING" filed on Mar. 18, 2016, incorporated supra, to obtain image components (e.g., downsampled component 342 and residual component 346). By way of a non-limiting illustration, individual images 252, 262 may be transformed to produce a lower resolution image component (e.g., a downsampled image) and higher resolution image component. In some implementations, the image encoding operation 704 may be effectuated by component 608 of the system 600 of FIG. 6.

At operation 706, the image components of a given resolution may be stitched with one another. In some implementations, the image stitching operation may include modification of pixels of one or more images in an area proximate a boundary between one or more field of views associated with individual images. Image stitching operations may include pixel level stitching configured to reduce a difference measure between values of pixels of one image and pixels of another image corresponding to a given location in the field of view. In one implementation, the difference measure may include a contrast measure. In some implementations, stitching operations 706 may include pixel level stitching of respective components of two hemispherical images including, e.g., a determination of an overlap area between the images, a determination of pixel locations at and/or proximate to boundary areas (e.g. denoted by line 256, 266 in FIG. 2A), image warp, pixel blend, and/or other operations. Stitching operations 706 may include a coarse stitching operation (e.g., 402 of FIGS. 4A-4B) and a fine stitching operation (e.g., 404 of FIG. 4A-4B). Coarse stitching may be applied to lower resolution image components, e.g., LL components 308, 328 in FIG. 3A and/or 342, 352 in FIG. 3B. Stitching operation 706 may also include fine stitching of higher resolution image components, e.g., LH, HL, and/or HH components 310, 330, 312, 332, 314, 334 in FIG. 3A and/or 346, 356 in FIG. 3B. In some implementations, the coarse stitching operation may include one or more of: (i) "cut and merge" (wherein source images are warped to match field of view boundaries, and placed side by side in equirectangular format); (ii) "cut and feather" (wherein pixels of the cut and merge operation that are in an overlap area may be smoothed (spatially averaged) so as to reduce stitch artifacts); (iii) thresholding; and/or (iv) a depth-based stitch operation that may include evaluating pixels within the overlap region in order to obtain depth map of objects within the region. For distant objects, the stitch operation may include a cut and merge and/or cut and feather operation. For close objects, a stretch/move operation may be applied in order to align pixels from two images corresponding to a given location; subsequently thereafter a cut and merge and/or cut and feather operation may be applied. The amount of stretch and/or move may be configured as a function of lens separation and/or lens geometry (e.g., FOV). It will be recognized by those skilled in the arts that the above stitching methods are exemplary and other stitching approaches may be utilized. More generally, a given stitching operation may be selected for a given image resolution such that to optimize balance between video quality, stitch speed, computational load and energy use. In one or more implementations, operation 706 may include stitching of one given image resolution (e.g., coarse stitching of downsampled image component, and/or the fine stitching of residual components, etc.). In some implementations, stitching operations 706 may be effectuated by the stitching component 610 of the system 600 of FIG. 6.

At operation 708, stitched image components may be combined. In some implementations, stitched components of one resolution (e.g., downsampled image 342) may be combined with the stitched components of another resolution (e.g., stitched residuals 346) of FIG. 3B. The image combination operation may include combining stitched image components (e.g., such as obtained at operation 706) to obtain stitched image output. In some implementations of wavelet-based image coding, the combining operation 708 may include operations to combine multiple stitched wavelet components, e.g., LL, LH, HL, HH. Operation 708 may be configured to obtain stitched image content, e.g., 420, 460 of FIGS. 4A-4B. In some implementations, image combining operation 708 may be effectuated by the content assembly component 612 of the system 600 of FIG. 6.

Multi-scale image stitching methodology described herein may be utilized for obtaining stitched spherical (360-degree) images and/or VR imaging content. In some implementations, multi-scale stitching functionality may be embodied in a spherical image capture device that may include two lenses configured to capture pairs of hemispherical images, e.g., device 200 of FIG. 2A. Individual images may be characterized by 180-degree (or greater) field of view. The capture device may store a pair of images representing left and right hemispheres encoded (in camera) using any applicable codec, e.g., H.264 and/or HEVC). In some implementations, methodology of the disclosure may be utilized with capture devices that may include four, six, eight, twelve, sixteen, and/or other number of lenses and/or image sensors.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "connection", "link", "transmission channel", "delay line", "wireless link" means a causal link between any two or more entities (whether physical or logical/virtual), which enables information exchange between the entities.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A computerized apparatus for providing a panoramic image, the computerized apparatus comprising:
   a non-transitory computer-readable medium comprising a plurality of computer-readable instructions configured to, when executed by one or more processor apparatus, cause the computerized apparatus to:
      obtain a plurality of high-resolution input images from a plurality of capture devices;

transform the plurality of high-resolution input images to produce at least a first downsampled image, a second downsampled image, a first residual image, and a second residual image;
combine the first downsampled image with the second downsampled image to produce a combined downsampled image;
combine the first residual image with the second residual image to produce a combined residual image; and
combine the combined downsampled image with the combined residual image to produce the panoramic image.

2. The computerized apparatus of claim 1, wherein:
(i) the first downsampled image and the first residual image are associated with a first of the plurality of high-resolution input images, and (ii) the second downsampled image and the second residual image are associated with a second of the plurality of high-resolution input images; and
the combination of the first downsampled image with the second downsampled image comprises a coarse stitch of the first downsampled image and the second downsampled image, the coarse stitch comprising usage of one or more first stitching operations.

3. The computerized apparatus of claim 2, wherein the combination of the first residual image with the second residual image comprises a fine stitch of the first residual image and the second residual image, the fine stitch comprising usage of one or more second stitching operations, the one or more second stitching operations differing at least in part from the one or more first stitching operations.

4. The computerized apparatus of claim 1, wherein each of the plurality of high-resolution input images comprises at least a first at least partly hemispherical image and a second at least partly hemispherical image, the first and second at least partly hemispherical images being captured by a camera device having the plurality of capture devices.

5. The computerized apparatus of claim 4, wherein the first and second at least partly hemispherical images comprise first and second hyper-hemispherical images, each having a respective field of view that exceeds 180 degrees, and each having a region of overlap with respect to each other; and
wherein the panoramic image comprises content having a 360-degree field of view.

6. The computerized apparatus of claim 5, wherein the plurality of computer-readable instructions are further configured to, when executed by the one or more processor apparatus, cause the computerized apparatus to modify one or more pixels associated with the region of overlap during one or more of (i) the combination of the first downsampled image with the second downsampled image, and (ii) the combination of the first residual image with the second residual image.

7. The computerized apparatus of claim 1, wherein each of the first and second downsampled images comprises a dimension having a value that is lower than a corresponding value of the plurality of high-resolution input images; and
wherein each of the first and second residual images comprises dimensions having a value that matches that of a corresponding one of the plurality of high-resolution input images.

8. A method for generating multi-resolution content, the method comprising:
obtaining a first high-resolution input image via a first camera;
obtaining a first image component and a second image component each being resultant from a decomposition of the first high-resolution input image, the first image component having a first resolution, the second image component having a second resolution that is different from the first resolution;
obtaining a third image component and a fourth image component, the third and fourth image components being resultant from the decomposition of the first high-resolution input image, the third and fourth image components having the second resolution; and
combining the first, second, third and fourth image components to generate a multi-resolution image.

9. The method of claim 8, further comprising obtaining a second set of image components, the second set of image components comprising first, second, third and fourth image components generated based on a decomposition of a second high-resolution input image obtained via a second camera, the first, second, third and fourth image components resultant from the first high-resolution input image comprising a first set of image components;
stitching the first set of image components with the second set of image components to generate panoramic content.

10. The method of claim 8, wherein the decomposition of the first high-resolution input image comprises a single-level wavelet decomposition; and
wherein the method further comprises utilizing at least one additional wavelet decomposition on at least the first image component to obtain a plurality of sub-components resultant from the at least the first image component.

11. The method of claim 8, further comprising reducing a difference measure for at least two of the first, second, third and fourth image components across the image boundary.

12. The method of claim 8, wherein the combining of the first, second, third and fourth image components comprises performing one or more of (i) a first stitching operation and (ii) a second stitching operation, the second stitching operation being different from the first stitching operation.

13. The method of claim 8, wherein the first resolution is a prescribed integer fraction of the second resolution.

14. A computerized apparatus for providing a panoramic image, the computerized apparatus comprising:
a non-transitory computer-readable medium comprising a plurality of computer-readable instructions configured to, when executed by one or more processor apparatus, cause the computerized apparatus to:
obtain a first high-resolution input image and a second high-resolution input image;
decomposing the first and second high-resolution input images to produce at least (i) a first image component and a second image component corresponding to the first high-resolution input image, and (ii) a first image component and a second image component corresponding to the second high-resolution input image;
combine, using one or more of a first plurality of stitching operations, at least the first image component corresponding to the first high-resolution input image with the first image component corresponding to the second high-resolution input image to produce a first combined image component;
combine, using one or more of a second plurality of stitching operations, at least the second image component corresponding to the first high-resolution input image with the second image component corresponding to the second high-resolution input image to produce a second combined image component, the second plurality of stitching operations at least partly differing from the first plurality of stitching operations; and combine at least the first combined image component with the second combined image component to produce the panoramic image.

15. The computerized apparatus of claim 14, wherein the decomposing of the first and second high-resolution input images comprises a wavelet decomposition, the wavelet decomposition outputting four image components for each of the first and second high-resolution input images, each of the four image components having one or more of a low-frequency energy and a high-frequency energy associated with each of a vertical and a horizontal dimension of the first and second input images.

16. The computerized apparatus of claim 14, wherein each of the first image component corresponding to the first high-resolution input image and the first image component corresponding to the second high-resolution input image comprises a resolution that is reduced as compared to that of the first and second high-resolution input images.

17. The computerized apparatus of claim 14, wherein the second image component corresponding to the first high-resolution input image and the second image component corresponding to the second high-resolution input image are each configured to contain information related to one of a horizontal edge, a vertical edge, or a diagonal edge within a respective one of the first high-resolution input image and the second high-resolution input image.

18. The computerized apparatus of claim 14, wherein the combination of the combined first component with the combined second image component comprises a stitch of (i) the combined first component, (ii) the combined second image component, and (iii) at least one other combined image component to obtain the panoramic image.

19. The computerized apparatus of claim 14, wherein the one or more of the first plurality of stitching operations comprises a stitching operation that requires fewer processing resources per pixel relative to the one or more of the second plurality of stitching operations.

20. The computerized apparatus of claim 19, wherein each of the first image component corresponding to the first high-resolution input image and the first image component corresponding to the second high-resolution input image comprises a resolution that is lower than that of each of the second image component corresponding to the first high-resolution input image and the second image component corresponding to the second high-resolution input image.

* * * * *